United States Patent
Schibur et al.

(10) Patent No.: US 11,913,207 B2
(45) Date of Patent: *Feb. 27, 2024

(54) PLUMBING FIXTURES WITH INSERT-MOLDED COMPONENTS

(71) Applicant: Kohler Co., Kohler, WI (US)

(72) Inventors: Mark Schibur, Sheboygan, WI (US); Jeremiah Rauwerdink, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,802

(22) Filed: Feb. 9, 2023

(65) Prior Publication Data

US 2023/0183963 A1  Jun. 15, 2023

Related U.S. Application Data

(63) Continuation of application No. 17/395,961, filed on Aug. 6, 2021, now Pat. No. 11,603,650, which is a continuation of application No. 16/244,659, filed on Jan. 10, 2019, now Pat. No. 11,118,338, which is a
(Continued)

(51) Int. Cl.
| | |
|---|---|
| *E03D 11/02* | (2006.01) |
| *E03D 11/13* | (2006.01) |
| *E03D 11/18* | (2006.01) |
| *E03D 5/12* | (2006.01) |
| *B32B 5/18* | (2006.01) |
| *B28B 1/16* | (2006.01) |
| *B28B 1/26* | (2006.01) |

(Continued)

(52) U.S. Cl.
CPC .............. *E03D 11/02* (2013.01); *E03D 11/13* (2013.01); *B28B 1/16* (2013.01); *B28B 1/261* (2013.01); *B32B 5/18* (2013.01); *B32B 27/08* (2013.01); *E03D 5/10* (2013.01); *E03D 5/12* (2013.01); *E03D 11/18* (2013.01)

(58) Field of Classification Search
CPC ................................ E03D 11/13; E03D 11/02
USPC ............................................................ 4/420
See application file for complete search history.

(56) References Cited

U.S. PATENT DOCUMENTS

| 1,058,270 A | 4/1913 | Stephens |
|---|---|---|
| 1,412,436 A | 4/1922 | Wilkin |
| 2,087,112 A | 7/1937 | Hiroshi |

(Continued)

FOREIGN PATENT DOCUMENTS

| CN | 101029499 A | 9/2007 |
|---|---|---|
| CN | 101518428 A | 9/2009 |

(Continued)

OTHER PUBLICATIONS

Chinese Office Action for Chinese Application No. 201810496110.X dated Aug. 11, 2020.
(Continued)

*Primary Examiner* — Christine J Skubinna
(74) *Attorney, Agent, or Firm* — Lempia Summerfield Katz LLC

(57) ABSTRACT

A plumbing fixture includes an electrical component insert-molded within a portion of the plumbing fixture, the portion formed from an epoxy. The electrical component is offset from and disposed below an outer surface of the plumbing fixture.

20 Claims, 20 Drawing Sheets

Related U.S. Application Data continuation-in-part of application No. 15/985,597, filed on May 21, 2018, now Pat. No. 11,047,122.

(60) Provisional application No. 62/509,588, filed on May 22, 2017.

(51) Int. Cl.
 *B32B 27/08* (2006.01)
 *E03D 5/10* (2006.01)

(56) References Cited

U.S. PATENT DOCUMENTS

| | | | |
|---|---|---|---|
| 2,287,371 A | 6/1942 | Blakesley et al. | |
| 2,447,738 A | 8/1948 | William | |
| 2,593,087 A | 4/1952 | Paul | |
| 2,717,953 A | 9/1955 | Brandi | |
| 2,972,034 A | 2/1961 | Easley | |
| 3,045,096 A | 7/1962 | Reginald | |
| 3,073,937 A | 1/1963 | Easley | |
| 3,212,106 A | 10/1965 | Austin | |
| 3,493,721 A | 2/1970 | Kamitani et al. | |
| 3,587,118 A | 6/1971 | Compton | |
| 3,591,868 A | 7/1971 | Owens | |
| 3,816,234 A | 6/1974 | Winfield | |
| 3,843,977 A * | 10/1974 | Garnett | E03D 11/02 4/421 |
| 3,982,288 A | 9/1976 | Borne | |
| 4,086,312 A * | 4/1978 | Midorikawa | B43K 1/12 401/199 |
| 4,086,318 A * | 4/1978 | Garasi | B29C 70/68 4/421 |
| 4,145,772 A | 3/1979 | Whitney et al. | |
| 4,160,295 A | 7/1979 | Putyra | |
| 4,209,862 A * | 7/1980 | Cortes-Garza | B32B 5/18 4/584 |
| 4,237,934 A | 12/1980 | Brian et al. | |
| 4,422,190 A | 12/1983 | Huang | |
| 4,446,584 A | 5/1984 | Suzuki et al. | |
| 4,558,473 A | 12/1985 | Morikawa et al. | |
| 4,697,656 A | 10/1987 | De Canecaude | |
| 4,736,471 A | 4/1988 | Johnson | |
| 4,841,583 A | 6/1989 | Ohara et al. | |
| 4,983,443 A | 1/1991 | Balmer et al. | |
| 5,022,946 A | 6/1991 | Stewart | |
| 5,033,508 A | 7/1991 | Laverty, Jr. | |
| 5,084,917 A | 2/1992 | Matsubara et al. | |
| 5,095,555 A | 3/1992 | Torii et al. | |
| 5,111,539 A | 5/1992 | Hiruta et al. | |
| 5,129,804 A | 7/1992 | Perantoni et al. | |
| 5,170,514 A | 12/1992 | Weigert | |
| 5,170,944 A | 12/1992 | Shirai | |
| 5,224,509 A | 7/1993 | Tanaka et al. | |
| 5,231,706 A | 8/1993 | Kendall | |
| 5,243,717 A | 9/1993 | Yasuo | |
| 5,276,595 A | 1/1994 | Patrie | |
| 5,307,524 A | 5/1994 | Veal | |
| D349,760 S | 8/1994 | Schlumpf | |
| 5,372,976 A | 12/1994 | Matsumoto et al. | |
| 5,398,352 A | 3/1995 | Kordelin | |
| 5,502,845 A * | 4/1996 | Hayashi | E03D 11/02 4/425 |
| 5,504,950 A | 4/1996 | Natalizia et al. | |
| 5,566,702 A | 10/1996 | Philipp | |
| 5,611,089 A | 3/1997 | Cretors | |
| 5,642,531 A | 7/1997 | Holtom et al. | |
| 5,655,749 A | 8/1997 | Mauerhofer | |
| 5,664,867 A | 9/1997 | Martin et al. | |
| 5,666,672 A | 9/1997 | Birsel et al. | |
| 5,694,653 A | 12/1997 | Harald | |
| 5,855,356 A | 1/1999 | Fait | |
| 5,868,311 A | 2/1999 | Cretu-petra | |
| 5,896,591 A | 4/1999 | Horan et al. | |
| 5,909,968 A | 6/1999 | Olin et al. | |
| 5,918,855 A | 7/1999 | Hamanaka et al. | |
| 5,926,099 A | 7/1999 | Unum | |
| 5,940,895 A | 8/1999 | Wilson et al. | |
| 5,961,095 A | 10/1999 | Schrott | |
| 5,978,975 A | 11/1999 | Asskaryar | |
| 6,019,130 A | 2/2000 | Rump | |
| 6,082,407 A | 7/2000 | Paterson et al. | |
| 6,154,892 A | 12/2000 | Hogue | |
| 6,203,164 B1 | 3/2001 | Tufekci et al. | |
| 6,212,700 B1 | 4/2001 | Giesler et al. | |
| 6,273,394 B1 | 8/2001 | Vincent et al. | |
| 6,294,786 B1 | 9/2001 | Marcichow et al. | |
| 6,307,180 B1 | 10/2001 | Arx et al. | |
| 6,321,785 B1 | 11/2001 | Bergmann | |
| 6,340,032 B1 | 1/2002 | Zosimadis | |
| 6,380,499 B1 | 4/2002 | Edwards | |
| 6,438,770 B1 | 8/2002 | Hed et al. | |
| 6,691,340 B2 | 2/2004 | Honda et al. | |
| 6,698,036 B2 | 3/2004 | Armbruster et al. | |
| 6,775,858 B1 | 8/2004 | Miller | |
| 6,775,863 B1 | 8/2004 | Hutchings | |
| 7,014,166 B1 | 3/2006 | Wang | |
| 7,104,519 B2 | 9/2006 | Omaley et al. | |
| 7,107,631 B2 | 9/2006 | Lang | |
| 7,161,118 B1 | 1/2007 | Modeste, Sr. et al. | |
| 7,263,758 B2 * | 9/2007 | Davies | B28B 1/26 4/300 |
| 7,293,297 B2 | 11/2007 | Hayashi et al. | |
| 7,325,781 B2 | 2/2008 | Parsons et al. | |
| 7,353,577 B2 | 4/2008 | Davies et al. | |
| 7,380,292 B1 | 6/2008 | Harris | |
| 7,430,988 B2 | 10/2008 | Perlsweig et al. | |
| 7,434,960 B2 | 10/2008 | Stuhlmacher et al. | |
| 7,472,433 B2 | 1/2009 | Rodenbeck et al. | |
| 7,543,339 B1 | 6/2009 | Harris | |
| 7,614,096 B2 | 11/2009 | Vincent | |
| 7,731,154 B2 | 6/2010 | Parsons et al. | |
| 7,760,332 B2 | 7/2010 | Yamaguchi | |
| 7,797,767 B2 | 9/2010 | Benkhardt et al. | |
| 7,819,541 B2 | 10/2010 | Kunkel | |
| 7,979,928 B2 | 7/2011 | Allen, Jr. | |
| 8,104,113 B2 | 1/2012 | Rodenbeck et al. | |
| 8,117,683 B2 | 2/2012 | Yamamoto et al. | |
| 8,191,182 B2 | 6/2012 | Mauduit | |
| 8,247,476 B2 | 8/2012 | Hajek et al. | |
| 8,355,822 B2 | 1/2013 | Jonte et al. | |
| 8,373,096 B2 | 2/2013 | Tsai et al. | |
| 8,376,313 B2 | 2/2013 | Burke et al. | |
| 8,407,821 B2 | 4/2013 | Chan | |
| 8,418,272 B2 | 4/2013 | Nishimura et al. | |
| 8,510,872 B2 | 8/2013 | Muehlhausen et al. | |
| 8,516,628 B2 | 8/2013 | Conroy | |
| 8,528,123 B2 | 9/2013 | Hashem et al. | |
| 8,536,254 B2 | 9/2013 | Marz et al. | |
| 8,555,427 B2 | 10/2013 | Kaule et al. | |
| 8,679,622 B2 | 3/2014 | Delong et al. | |
| 8,827,239 B2 | 9/2014 | Chen | |
| 8,881,317 B2 | 11/2014 | Tokunaga | |
| 8,910,320 B2 | 12/2014 | Stauber et al. | |
| 8,944,105 B2 | 2/2015 | Rodenbeck et al. | |
| 8,978,172 B2 | 3/2015 | Plate et al. | |
| 8,984,679 B2 | 3/2015 | Bayley et al. | |
| 9,010,377 B1 | 4/2015 | O'brien et al. | |
| 9,021,620 B1 | 5/2015 | Walker | |
| 9,169,628 B2 | 10/2015 | Komorita | |
| 9,194,110 B2 | 11/2015 | Frick et al. | |
| 9,279,239 B2 | 3/2016 | Feng | |
| 9,290,922 B2 * | 3/2016 | Bernabei | B28B 1/14 |
| 9,321,897 B2 | 4/2016 | Kabeya et al. | |
| 9,341,278 B2 | 5/2016 | Esche | |
| 9,347,207 B2 | 5/2016 | Chen | |
| 9,445,699 B2 | 9/2016 | Mangrum, Jr. | |
| 9,562,549 B2 | 2/2017 | Mcclure | |
| 9,596,961 B2 | 3/2017 | Stokely et al. | |
| 9,632,537 B2 | 4/2017 | Memering et al. | |
| 9,896,961 B2 | 2/2018 | Brunschwig et al. | |
| 2001/0037520 A1 | 11/2001 | Farzanehfar | |
| 2002/0021086 A1 | 2/2002 | Czak | |
| 2003/0041374 A1 | 3/2003 | Franke | |

(56) References Cited

U.S. PATENT DOCUMENTS

| | | |
|---|---|---|
| 2004/0032749 A1 | 2/2004 | Schindler et al. |
| 2004/0226082 A1 | 11/2004 | Squicciarini |
| 2004/0228127 A1 | 11/2004 | Squicciarini |
| 2006/0214016 A1 | 9/2006 | Erdely et al. |
| 2006/0258915 A1 | 11/2006 | Ueda et al. |
| 2007/0151011 A1 | 7/2007 | Brown |
| 2008/0010734 A1 | 1/2008 | Chang |
| 2008/0109956 A1 | 5/2008 | Bayley et al. |
| 2008/0271231 A1 | 11/2008 | Stauber et al. |
| 2010/0127607 A1 | 5/2010 | Harris |
| 2011/0191950 A1 | 8/2011 | Liu |
| 2012/0000012 A1 | 1/2012 | Cheung |
| 2012/0023651 A1 | 2/2012 | Taylor et al. |
| 2012/0266371 A1 | 10/2012 | Zhang |
| 2012/0273703 A1 | 11/2012 | Hsu et al. |
| 2013/0007953 A1 | 1/2013 | Niu et al. |
| 2013/0174929 A1 | 7/2013 | Song |
| 2013/0198947 A1 | 8/2013 | Yeung |
| 2013/0299026 A1 | 11/2013 | Gossing et al. |
| 2014/0102634 A1 | 4/2014 | Harder |
| 2015/0013056 A1 | 1/2015 | Lee |
| 2015/0013784 A1 | 1/2015 | Roje et al. |
| 2015/0085429 A1 | 3/2015 | Memering et al. |
| 2016/0145548 A1 | 5/2016 | Van Tol et al. |
| 2016/0235263 A1 | 8/2016 | Du et al. |
| 2016/0263796 A1 | 9/2016 | Hua |
| 2017/0043875 A1 | 2/2017 | Vervaet et al. |

FOREIGN PATENT DOCUMENTS

| | | |
|---|---|---|
| CN | 103362198 A | 10/2013 |
| CN | 203267335 U | 11/2013 |
| DE | 19730330 A1 | 1/1999 |
| DE | 20206136 U1 | 8/2002 |
| DE | 20206139 U1 | 8/2002 |
| DE | 102005056630 A1 | 4/2007 |
| DE | 102010037800 A1 | 3/2012 |
| EP | 0239877 A2 | 10/1987 |
| EP | 0679359 A1 | 11/1995 |
| EP | 1464766 A2 | 10/2004 |
| EP | 0961067 B1 | 2/2005 |
| EP | 1961876 A2 | 8/2008 |
| EP | 2034097 A2 | 3/2009 |
| EP | 2088251 A2 | 8/2009 |
| EP | 2090701 A1 | 8/2009 |
| EP | 2189583 A2 | 5/2010 |
| EP | 2210988 A2 | 7/2010 |
| EP | 2281957 A2 | 2/2011 |
| EP | 2537894 A1 | 12/2012 |
| EP | 2572616 A2 | 3/2013 |
| EP | 2882058 A1 | 6/2015 |
| EP | 2934265 A1 | 10/2015 |
| EP | 3037025 A1 | 6/2016 |
| EP | 3075529 A1 | 10/2016 |
| EP | 3406812 A1 | 11/2018 |
| GB | 1541444 A | 2/1979 |
| JP | H1037279 A | 2/1998 |
| JP | 2001327437 A | 11/2001 |
| JP | 2004242802 A | 9/2004 |
| JP | 2016147978 A | 8/2016 |
| SE | 380856 B | 11/1975 |
| WO | 1996025564 A1 | 8/1996 |
| WO | 2005080057 A1 | 9/2005 |
| WO | 2008024005 A2 | 2/2008 |
| WO | 2011054056 A1 | 5/2011 |
| WO | 2013119844 A1 | 8/2013 |

OTHER PUBLICATIONS

European Examination Report for European Patent Application No. 18 173 473.2—1002 dated Jul. 10, 2020.

Haddadi, Hamed; Henderson, Tristan; Crowcroft, JonThe ambient loo—Caught short when nature calls? Apr. 2010 Computer Communication Review, v 40, n 2, p. 78, Apr. 2010; ISSN: 01464833, E-ISSN: 19435819; DOI: 10.1145/1764873.1764887; Publisher: Association for Computing Machinerybra href="http:/dl.acm.org/citation.cfm?doid=" target="_blank"http://dl.acm.org/citation.cfm?doid=/a 1764873.1764887.

International Search Report and Written Opinion, PCT/US2020/012779, Kohler Co., 6 pages. (dated Apr. 2, 2020).

PCT International Preliminary Report on Patentability and Written Opinion of International Searching Authority corresponding to PCT International Application No. PCT/US2020/012779 dated Jun. 16, 2021.

PCT International Preliminary Report on Patentability and Written Opinion of International Searching Authority, corresponding to PCT International Application No. PCT/US2020/012779 dated Jul. 22, 2021.

Extended European Search Report from European Patent Application No. 21206032.1, dated Sep. 15, 2023, 6 pages.

\* cited by examiner

PLUMBING FIXTURES WITH INSERT-MOLDED COMPONENTS

CROSS-REFERENCE TO RELATED APPLICATION

This application is a Continuation under 35 U.S.C § 120 and 37 C.F.R. § 1.53(b) of U.S. patent application Ser. No. 17/395,961 filed Aug. 6, 2021, which is a Continuation of U.S. patent application Ser. No. 16/244,659 filed on Jan. 10, 2019, which is a Continuation-in-Part of U.S. patent application Ser. No. 15/985,597, filed May 21, 2018, which claims the benefit of and priority to U.S. Provisional Patent Application No. 62/509,588, filed May 22, 2017. The entire disclosures of each of the aforementioned applications are incorporated herein by reference.

BACKGROUND

The present application relates generally to the field of plumbing fixtures with components molded therein and more specifically to electrical components insert-molded into the plumbing fixture, below an outer surface thereof. The present application further relates to toilet assemblies that include a glazed vitreous china flush engine having a polymeric outer structure overmolded or otherwise formed onto the flush engine.

Conventional plumbing fixtures are formed from vitreous china. As part of the manufacturing process, the plumbing fixture is fired at a high temperature until it is hardened. Due to the high temperatures and the molding process, it can be difficult to install electrical or other components in the plumbing fixture during the molding process without causing damage to the component. Instead, these components are installed later in the process, rather than being concealed in an interior portion of the plumbing fixture. This current limitation means that electrical components are generally exposed to water after being installed and therefore require further waterproofing for protection, which increases the cost and complexity of the component and its installation.

It would be advantageous to form a plumbing fixture out of an epoxy or other flowing moldable material, which can be molded around various components installed in the plumbing fixture. It would further be advantageous for the components to be electrical components that can be concealed within the plumbing fixture for visual effect and protection from water. These and other advantageous features will be apparent to those reviewing the present disclosure.

Further, conventional floor-standing toilets include a pedestal or base that includes a bowl for containing water and waste prior to flushing. The toilet may optionally include a tank for containing flush water, which may either be integrally formed with the base or may be a separate component coupled to the base. The base also includes a sump and a trapway for routing the flush water from the bowl to the drain and various internal waterways that route water to the rim and/or sump of the toilet. Generally speaking, the entire base (including the bowl, sump, trapway, waterways, and any aesthetic features on the outer surface of the base) is cast from a vitreous china material in a single casting operation such that all of the components are integrally formed. Ensuring that the various waterways within the toilet are properly formed and provide the desired performance characteristics for the toilet presents a significant engineering challenge, and is the subject of extensive research and design efforts.

One challenge relates to the fact that each time a new toilet design is created (e.g., a new aesthetic design for the base), the entire flush engine for the toilet (i.e., the bowl, sump, and trapway) must be re-engineered and validated to ensure that it provides desired flow and other performance characteristics. One consequence of this is that it may take a relatively significant amount of time and cost to bring a new toilet design to market because of the engineering time and effort involved. This may also result in toilets of various aesthetic designs having different performance characteristics.

It would be advantageous to reduce the amount of time and effort required to design and manufacture a new toilet design. It would also be advantageous to provide an improved toilet design that may be produced in a more energy efficient manner than conventional toilets. These and other advantageous features will become apparent to those reviewing the present disclosure.

SUMMARY

One embodiment relates to a plumbing fixture, including an electrical component insert-molded within a portion of the plumbing fixture, the portion formed from an epoxy. The electrical component is offset from and disposed below an outer surface of the plumbing fixture.

Another embodiment relates to an electrical component for a plumbing fixture, including at least one sensor and at least one light source. The at least one sensor and at least one light source are disposed below an outer surface of the plumbing fixture formed from a semi-translucent material.

Another embodiment relates to a seat assembly for a toilet, including a lid having an upper surface and a lower surface, the lid formed from an epoxy. The seat assembly further includes a light source insert-molded into the lid between and spaced apart from the upper and lower surfaces.

DETAILED DESCRIPTION

According to an exemplary embodiment, a toilet includes a pre-formed flush engine (including, for example, a bowl, sump, and trapway) that is provided within a surrounding shell (e.g., shroud, pedestal, cover, etc.) formed of a polymeric material. Waterways and other features may be coupled to the flush engine and secured in place by the polymeric material. One advantageous feature of such a configuration is that it allows for reduced development costs for new toilet designs by using a separate standardized flush engine and waterway structure while giving designers freedom to create an external structure that may have varying aesthetic designs. In other words, rather than re-engineering a flush engine each time a new aesthetic design is created, one can simply design the shell and apply it to a standard flush engine, significantly reducing the amount of engineering effort required and reducing the time to market.

Figure 1:
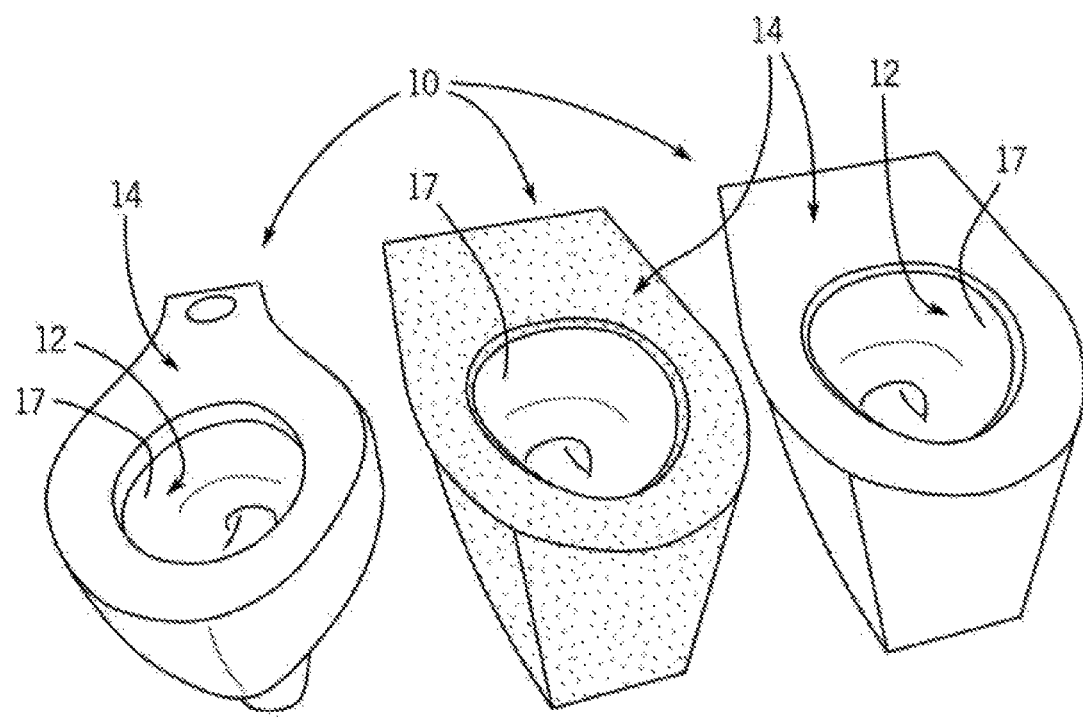
FIG. 1 shows various embodiments of toilet assemblies.

Referring to FIG. 1, toilet assemblies 10 are shown according to various exemplary embodiments. The toilet assembly 10 includes a flush engine 12 separately formed from and disposed within a shell 14 (e.g., housing, skin, etc.) that is formed of one or more polymeric materials that are over-molded directly onto or otherwise secured to an outer surface of the flush engine 12, as will be described in greater detail below. For example, the shell 14 may be formed from two layers, including a foam inner core (e.g., an epoxy foam or other foams), generally defining the outer shape of the toilet assembly 10, and a resin outer layer disposed on the foam layer, providing a desired surface appearance. According to various exemplary embodiments, the layers may be formed from materials, including epoxy resin (e.g., bisphenol A, bisphenol F, novolac, aliphatic, glycidylamine, etc.), adhesives, elastomers, or polymers (e.g., nylons, polyethylene, polypropylene, polystyrene, polyurethane, polyvinyl chloride, etc.) Although the three toilets shown in FIG. 1 have different external aesthetic designs, including at least shape and color, they may share a common flush engine design.

Figure 2:
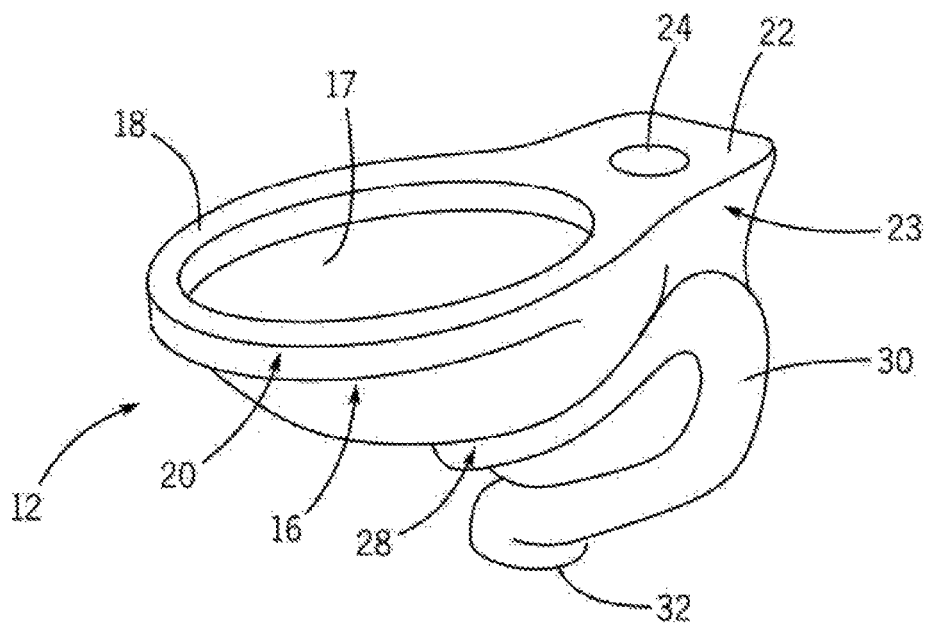
FIG. 2 shows a pre-formed flush engine.

Referring to FIG. 2, a drawing of such a flush engine there referred to again as flush engine 12) is shown according to an exemplary embodiment. The flush engine 12 is formed form vitreous china according to one exemplary embodiment. The flush engine 12 includes a bowl 16 having a rim 18 (e.g., an upper surface) at an upper edge 20 of the bowl 16. The bowl 16 includes an inner surface 17. The flush engine 12 further includes a sump 28 at a lower portion of the inner surface 17 of the bowl 16 and a trapway 30 extending downstream from the sump 28 and defining a drain outlet 32 configured to be fluidly coupled to a drain when the toilet assembly 10 is installed in a bathroom.

The flush engine 12 includes a substantially flat (e.g., planar) upper surface 22, having an edge 23 formed at an outer periphery of the upper surface 22. When the toilet assembly 10 includes a tank (not shown) for providing water to the inner surface 17 of the bowl 16, the upper surface 22 may define an inlet opening 24 configured to receive water from the tank and deliver the water to a flush opening or openings 26 formed in the bowl 16 proximate the rim 18. Similarly, in a configuration without a tank, a flush valve (not shown) may be fluidly coupled to the inlet opening 24 for providing water to the inner surface 17 of the bowl 16. According to another exemplary embodiment, the toilet assembly 10 is configured to be connected to a wall carrier (e.g., for a wall-mounted toilet). In this configuration, the upper surface 22 may not include an inlet opening 24.

The flush engine 12 is formed from vitreous china or other suitable sanitary material. For example, according to other exemplary embodiments, the flush engine 12 may be formed from a polymer, metal, or composite or from multiple components having different materials and assembled into a single flush engine assembly. The sanitary material is configured to engage waste and waste water and be easily cleanable and resilient to cleaning chemicals. In a conventional toilet, after the toilet is cast and assembled, both the inner and outer surfaces of the entire toilet are glazed and certain treatments may be applied to the surface of the bowl and/or trapway to provide desired performance characteristics (e.g., anti-staining or other coatings may be applied).

Unlike conventional fully-glazed toilets, however, the toilet embodiments of the present application may include glazing on only a portion of the toilet, which is exposed to waste during a flush sequence. While FIGS. 1 and 2 show the inner surface 17 of the bowl 16, it should be understood that the sump 28 and the trapway 30 are fluidly connected to the bowl 16 and similarly define inner surfaces extending from the inner surface 17 of the bowl 16, and collectively, forming an inner surface of the flush engine 12. In particular, the bowl 16, sump 28, and trapway 30 may be integrally formed, such that the inner surface of the flush engine 12 forms a smooth continuous surface extending through each of the bowl 16, sump 28, and trapway 30.

In the configurations shown in FIGS. 1 and 2, only an inner surface of the flush engine 12 is glazed, since the rest of the flush engine is concealed by the shell 14 and does not experience the same use conditions as the rest of the toilet. In this configuration, after the flush engine 12 is cast, the inner surface 17 of the bowl 16, the inner surface of the trapway 30, and/or the inner surface of a passage fluidly connecting the inlet opening 24 to the bowl 16 are glazed and the rest of the flush engine 12 (e.g., outer surfaces) may remain unglazed. The unglazed outer surfaces of the flush engine 12 may include the upper surface 22, an outer surface of the bowl 16, and/or an outer surface of the trapway 30. By only glazing an inner surface of the flush engine 12, the material and energy costs associated with glazing a toilet may be significantly reduced.

Figure 3:
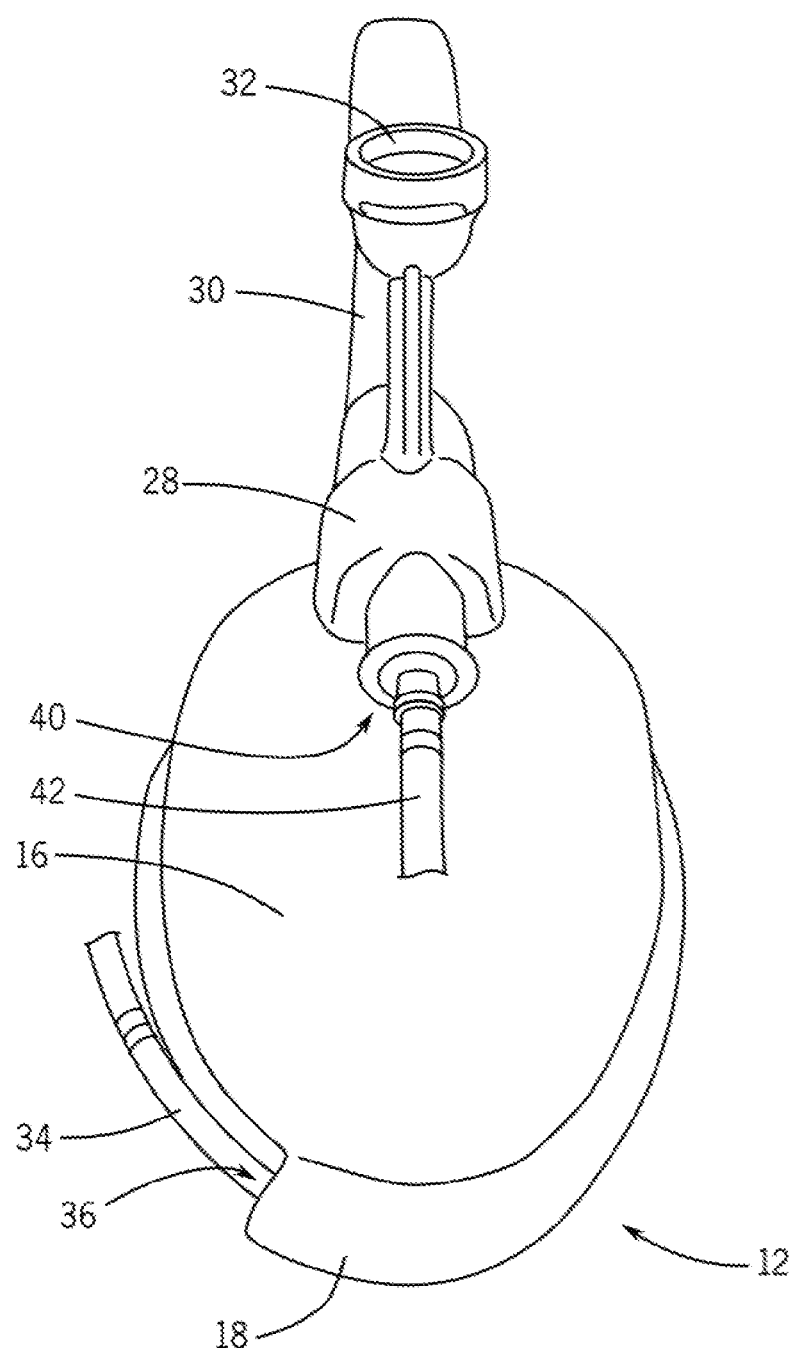
FIG. 3 is a bottom perspective view of a flush engine, according to an exemplary embodiment.
Figure 4:
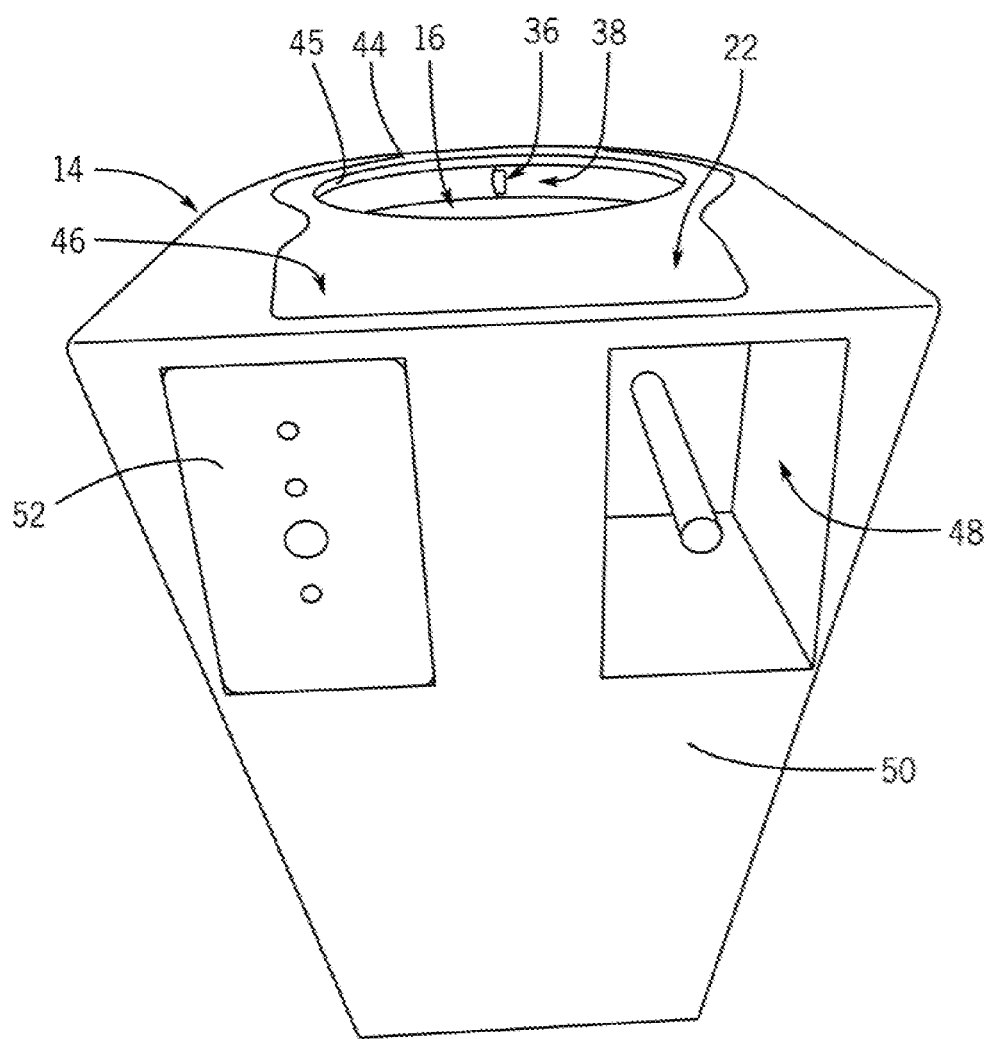
FIG. 4 shows a vitreous bowl with an integrally-formed flush ring.

Referring now to FIG. 3, the flush engine 12 is shown according to an exemplary embodiment. The flush engine 12 includes a rim supply line 34 fluidly coupled to or received in a rim opening 36 formed proximate the rim 18 and extending through the bowl 16 from the outer surface to the inner surface 17. The rim supply line 34 is configured to receive water from a water source and supply the water to the bowl 16 during a flushing sequence. Referring to FIG. 4, the bowl 16 is shown defining a channel 38 formed proximate the upper edge 20 of the bowl 16. The channel 38 is configured to introduce water to the bowl 16, such that the water generates a vortex for passing waste through the sump 28 and into the trapway 30. For example, introduction of water through the rim opening 36 may raise the water level in the bowl 16 until a siphon is generated, thereby evacuating the contents of the bowl 16. While FIG. 4 shows a channel 38, according to other exemplary embodiments, water may be introduced to the bowl 16 at the rim 18 in other ways. For example, the rim 18 may define a passage that is generally enclosed and defines a plurality of openings for introducing water to the bowl 16. The passage may be integrally formed with the rest of the flush engine 12 or may be separately formed from the flush engine 12 and subsequently coupled to the flush engine 12. The passage may also be formed from vitreous china or may be formed from plastic or other suitable material (e.g., a plastic tube or conduit that is molded within the assembly and secured in place by the shell.

Referring again to FIG. 3, the rim supply line 34 may be formed from a plastic, PEX, or other suitable flexible material. The rim supply line 34 may be received in the rim opening 36 with a gasket (e.g., o-ring) disposed between the rim supply line 34 and the rim opening 36, such that the rim supply line 34 sealingly engages the rim opening 36. Furthermore, the sealed engagement prevents polymeric material (e.g., foam, resin, or other materials) from entering into the rim 18 through the rim opening 36 during an injection molding process, as will be described in further detail below. According to another exemplary embodiment, the rim supply line 34 may be formed as a hollow core in the shell 14.

Still referring to FIG. 3, the flush engine 12 may further define a sump opening 40 at a forward portion of the sump 28. A sump supply line 42 is received in the sump opening 40 and is configured to receive water from the water source and supply the water to the sump 28. For example, in a wash-down toilet, water may be supplied to the sump 28 during a flushing cycle in order to evacuate the contents from the bowl 16. Similarly to the rim supply line 34, the sump supply line 42 may be formed from a plastic, PEX, or other suitable flexible material. The sump supply line 42 may be received in the sump opening 40 with a gasket (e.g., o-ring) disposed between the sump supply line 42 and the sump opening 40, such that the sump supply line 42 sealingly engages the sump opening 40. Furthermore, the sealed engagement prevents polymeric material (e.g., foam, resin, or other materials) from entering into the sump 28 through the sump opening 40 during an injection molding process. According to another exemplary embodiment, the sump supply line 42 may be formed as a hollow core in the shell 14.

Referring to FIG. 4, the shell 14 defines a forward portion 44, configured to house the bowl 16 and a rear portion 46 configured to face a wall in a bathroom when the toilet assembly 10 is installed. The forward portion 44 defines a bowl opening 45 corresponding to the rim 18 of the bowl 16. The rear portion 46 defines one or more cavities 48 formed in a rear surface 50 of the shell 14. As shown in FIG. 4, the rim supply line 34 and/or the sump supply line 42 may extend out from the shell 14 at the cavities 48. A cover 52 may be sized to be received in each cavity 48 to at least partially enclose the components housed in the cavity 48. According to an exemplary embodiment, at least one cavity 48 may house electronic components (e.g., junction box) or controls.

Figure 5:
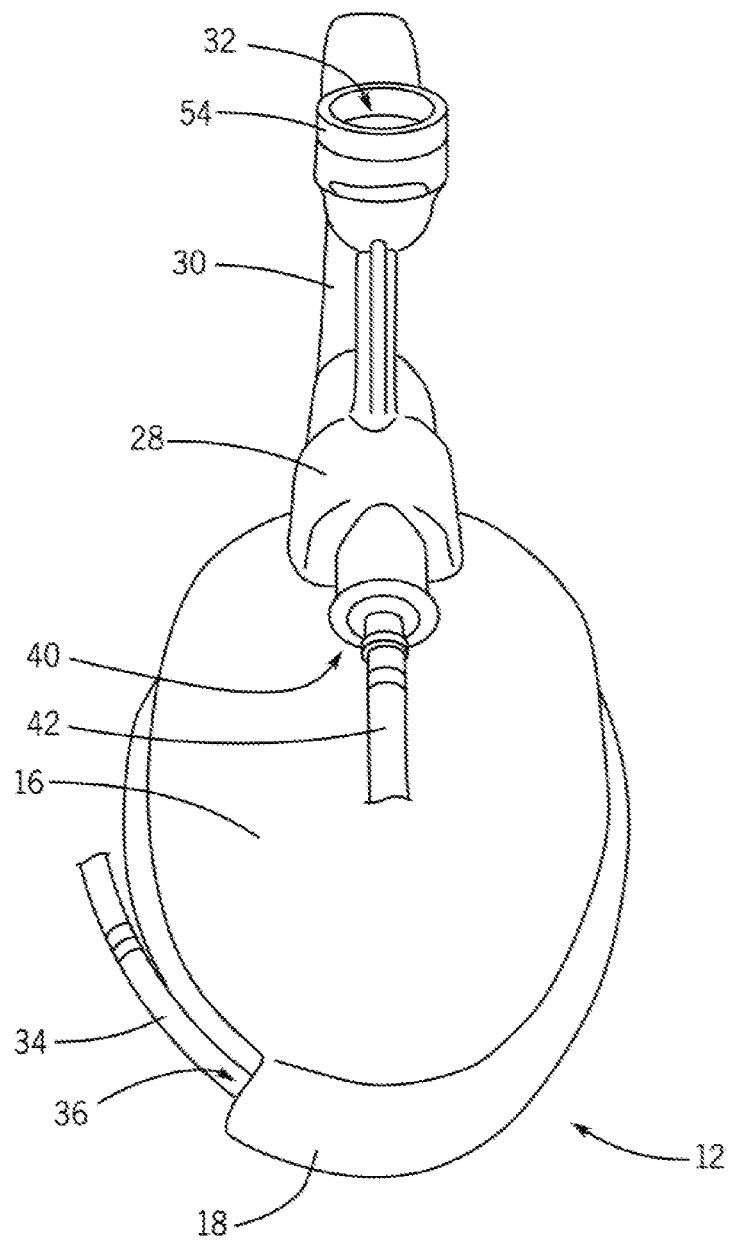
FIG. 5 is a bottom plan view of the flush engine of FIG. 3, with a mounting bracket installed.

Referring now to FIG. 5, the flush engine 12 is shown with a mounting flange 54 (e.g., a connector) disposed on the drain outlet 32 of the trapway 30. The mounting flange 54 is coupled to the drain outlet 32 and is configured to be coupled to a corresponding drain in a bathroom. For example, the mounting flange 54 is configured to provide a sealing connection between the drain outlet 32 and the drain, such that leakage of waste from the drain outlet 32 is limited or prevented. According to an exemplary embodiment, the mounting flange 54 may be a gasket received between the drain outlet 32 and the floor of a bathroom.

Figure 6A:
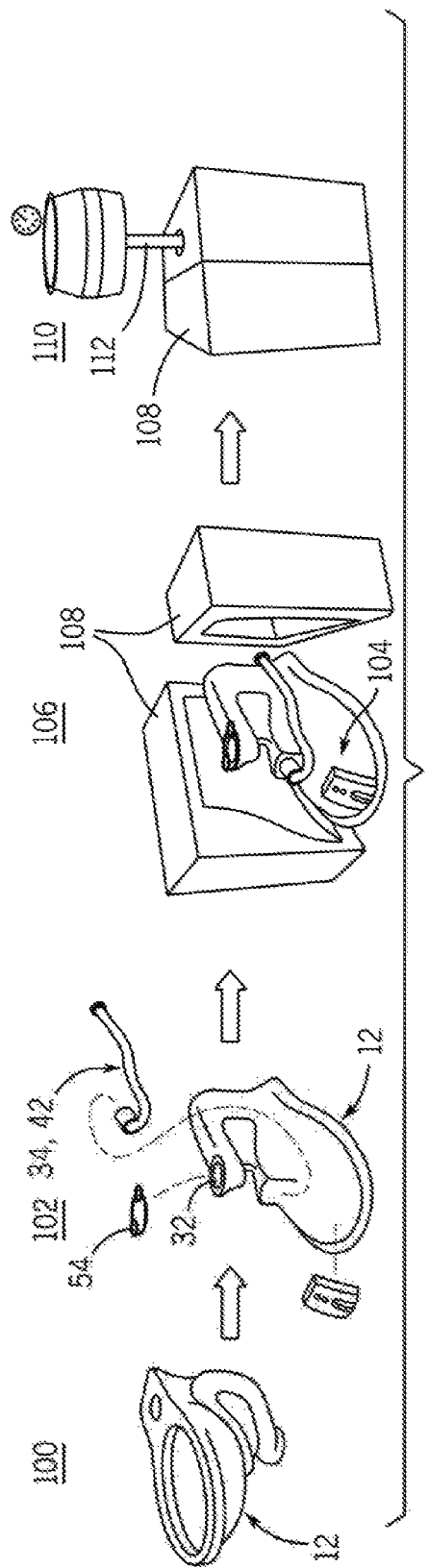
FIG. 6A is a schematic of a portion of a process for forming the toilet assembly.
Figure 6B:
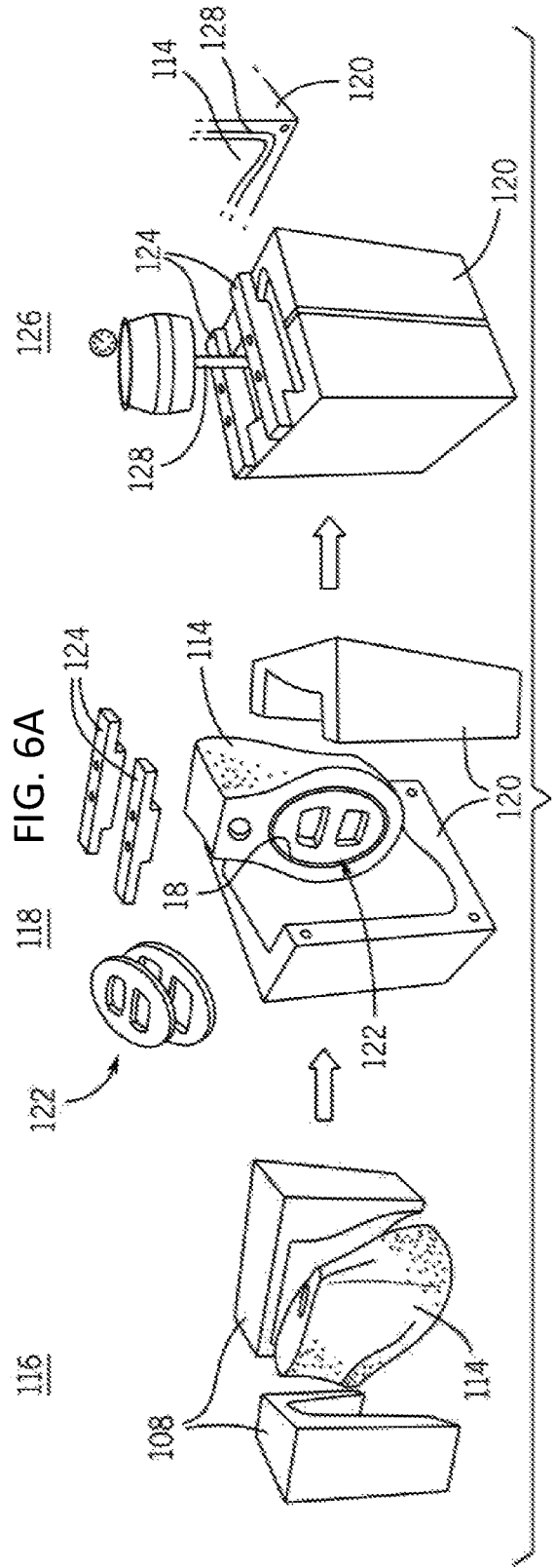
FIG. 6B is a schematic of another portion of the process in FIG. 6A.
Figure 6C:
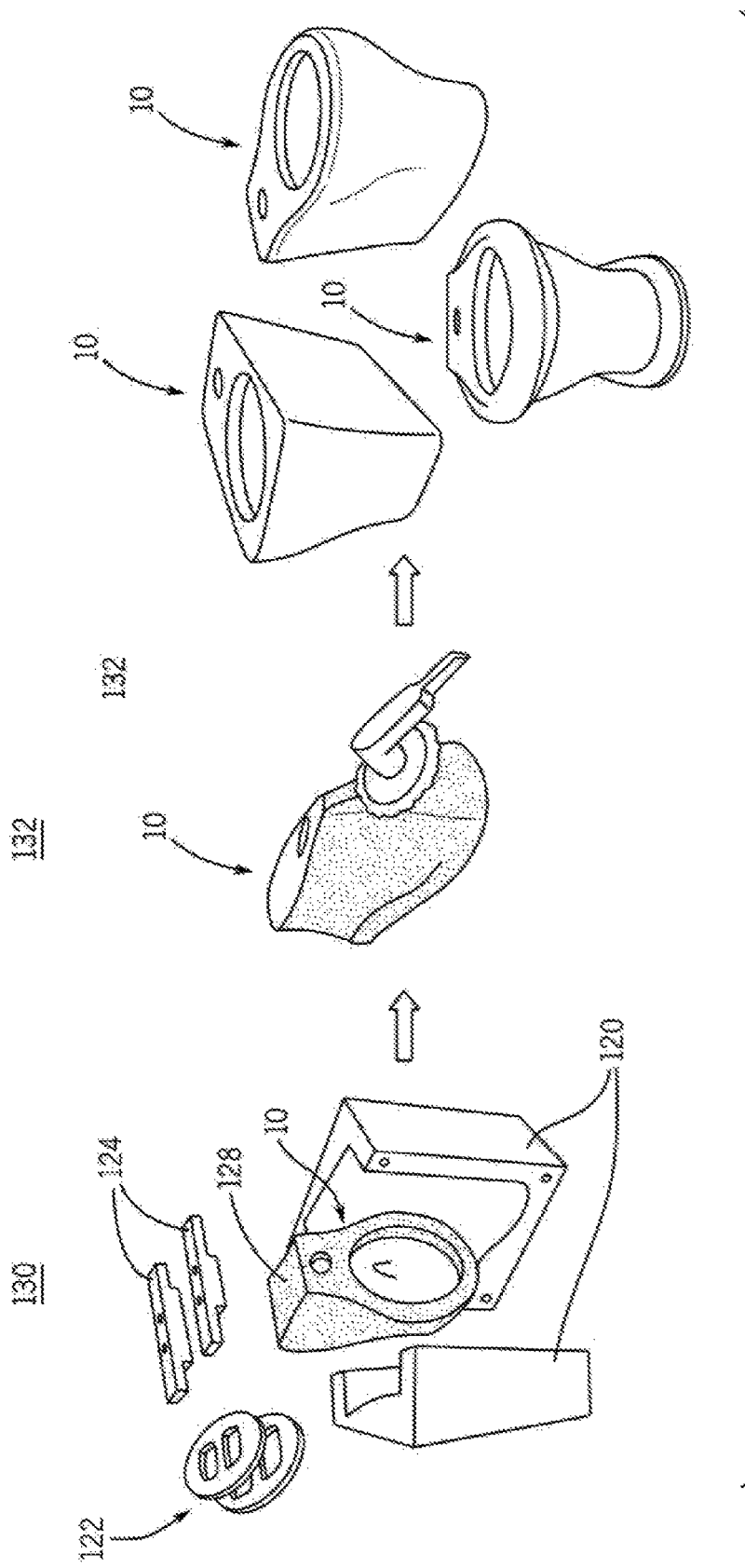
FIG. 6C is a schematic of another portion of the process in FIGS. 6A and 6B.

Referring now to FIGS. 6A-6C, one non-exclusive exemplary method of forming the toilet assembly 10 is shown according to an exemplary embodiment. Referring to FIG. 6A, in a first step 100, the flush engine 12 is cast from vitreous china. As discussed above, the inner surfaces of the bowl 16 and the trapway 30 are glazed while the outer surfaces remain unglazed. According to another exemplary embodiment, the flush engine 12 is pre-formed in other ways (e.g., injection molded, stamped, assembled, etc.) or from other materials (e.g., polymer, metal, composite, etc.).

In a second step 102, functional inserts are installed on or proximate to the flush engine 12 to form a flush engine subassembly 104. Functional inserts may include plumbing (e.g., the rim supply line 34, the sump supply line 42, etc.), the mounting flange 54, and other components. For example, various electronic components may be installed on or proximate to the flush engine 12 for integral molding within the shell 14. Such electronic components may include lighting (e.g., led light strips), sensors (e.g., proximity sensors, touch sensors, light sensors, etc.), wiring, and/or other components. For other plumbing or sanitary fixtures formed using the method shown in FIG. 6, the functional inserts may include other flexible or rigid tubes, hoses, or conduits, which fluidly connect a water supply to an inner surface of a base structure of the plumbing or sanitary fixture through a corresponding opening in the base structure. A gasket is disposed between the functional insert and the corresponding opening similarly to the with the rim supply line 34 and the sump supply line 42, as described above, such that foam does not pass between the functional insert and the corresponding opening.

In a third step 106, the flush engine subassembly 104 is placed within a first mold 108. The first mold 108 is a female mold configured to receive the flush engine subassembly 104 therein. The first mold 108 may include male portions corresponding with the cavities 48 in order to provide access to the functional inserts after the molding process. While the third step 106 shows the flush engine subassembly 104 being inserted into the first mold 108 with functional inserts installed, according to another exemplary embodiment, the first mold 108 includes additional male portions that extend from the rim opening 36 and/or the sump opening 40 to corresponding cavities 48 to form a conduit in the molding process. In this configuration, the second step 102 may be skipped or may be performed after the third step 106, such that the functional inserts are installed through the voids formed in the third step 106 by the male portions of the first mold 108.

The first mold 108 defines a first shape similar to but smaller than a desired finished outer shape of the toilet assembly 10. Because the toilet assembly 10 is injection-molded, this desired shape is not limited by conventional vitreous casting requirements, providing much broader flexibility in final toilet design (e.g., the ability to form much sharper edges and more defined features than would be possible in a conventional vitreous china casting process). The first mold 108 is further configured to completely cover and enclose the bowl 16 at the upper edge 20, such that foam does not enter the bowl 16 during the molding process. For example, the upper surface 22 of the flush engine 12 may be disposed directly against an inner surface of the first mold 108, such that the foam is prevented from contacting the upper surface 22 and entering the bowl 16 when introduced into the first mold 108. As shown in FIG. 6, the flush engine subassembly 104 may be oriented upside down (e.g., with the bowl 16 facing down and the drain outlet 32 facing up), although the flush engine subassembly 104 may be oriented in other directions in the first mold 108 according to other exemplary embodiments.

In a fourth step 110, the first mold 108 is closed and a first polymeric material 112 (e.g., a foam) is injected into the female portion of the first mold 108 under pressure, such that the first polymeric material 112 completely fills in the first mold 108 around the flush engine 12. The first polymeric material 112 may be a polystyrene (e.g., polyester), urethane, acrylic, or other suitable epoxy material configured to cure as a solid rigid enough to support the flush engine 12. As shown in the fourth step 110, the first polymeric material 112 cures until it is hardened and forms a subassembly 114. For example, where an epoxy foam is used for the first polymeric material 112, the material may cure with a density of between approximately 5 and 50 lb/ft$^3$. Such density or higher may also be achieved with other polymeric materials.

Referring now to FIG. 6B, in a fifth step 116, the subassembly 114 is removed from the first mold 108. In the subassembly 114, the functional inserts are completely surrounded by the hardened first polymeric material 112, such that the functional inserts are prevented from moving within the subassembly 114. The first polymeric material 112 is not water porous and therefore forms a further seal around the rim supply line 34 and the sump supply line 42, preventing water from leaking out of the subassembly 114 during a flushing sequence. Because the first polymeric material 112 is molded around the functional inserts, the first polymeric material 112 itself provides the structure for holding the functional inserts into position, such that no additional structure is required to hold the functional inserts in place (although, optionally, fasteners could be provided to couple the functional inserts in a desired location prior to the molding operation). According to another exemplary embodiment, where the subassembly 114 does not include functional inserts, channels formed by male portions of the first mold 108 are not water porous and therefore may carry water directly to the flush engine without installing a conduit in the channels.

Figure 7:
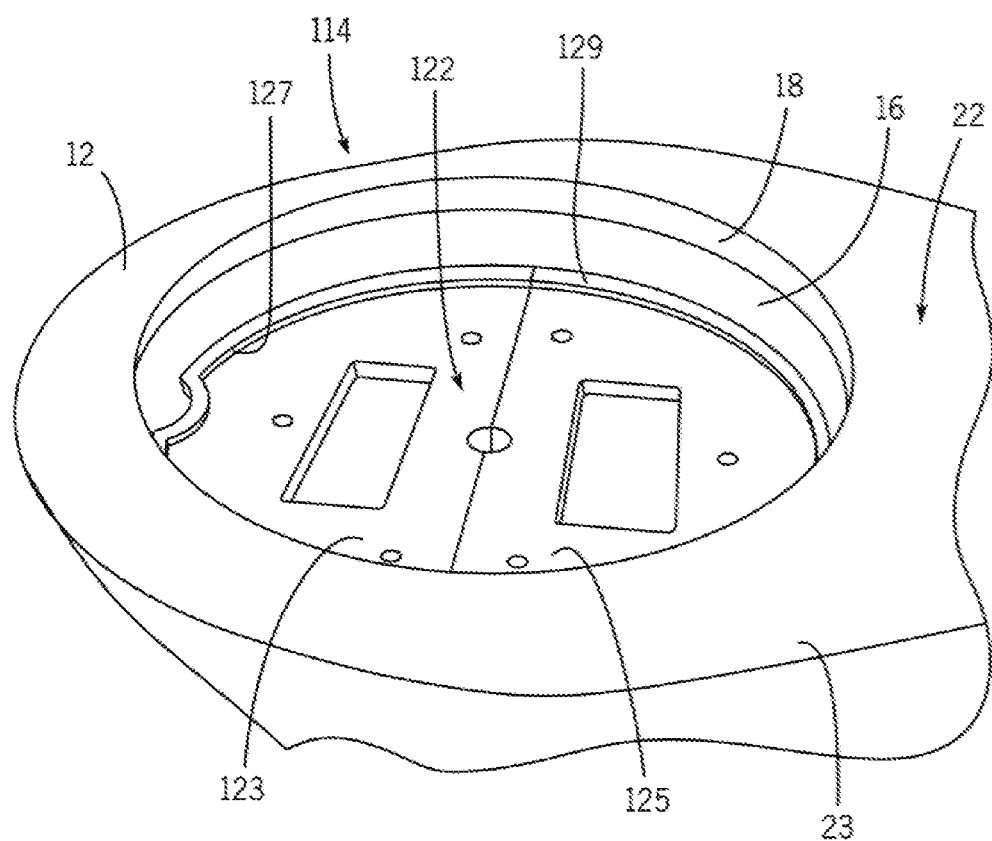
FIG. 7 is a perspective view showing a portion of a rim insert being installed in a foam subassembly.

Referring to FIG. 7, the subassembly 114 is shown according to an exemplary embodiment. As shown in FIG. 7, the first polymeric material 112 extends generally coplanar with the upper surface 22 of the flush engine 12 (e.g., extending laterally outward from the edge 23 of the upper surface 22), but is not disposed on top of the upper surface 22. In this configuration, the application of the first polymeric material 112 does not increase a height of the upper surface 22. The first polymeric material 112 may include a colorant (e.g., approximately 2% colorant), such that the color of the first polymeric material 112 corresponds to the color of the upper surface 22 or other portions of the flush engine 12. In this configuration, the flush engine 12 may not be distinguishable from the first polymeric material 112 based on color alone. According to other exemplary embodiments, the first polymeric material 112 may be disposed on the upper surface 22, such that the first polymeric material 112 defines a desired shape of the upper surface 22.

Figure 8:
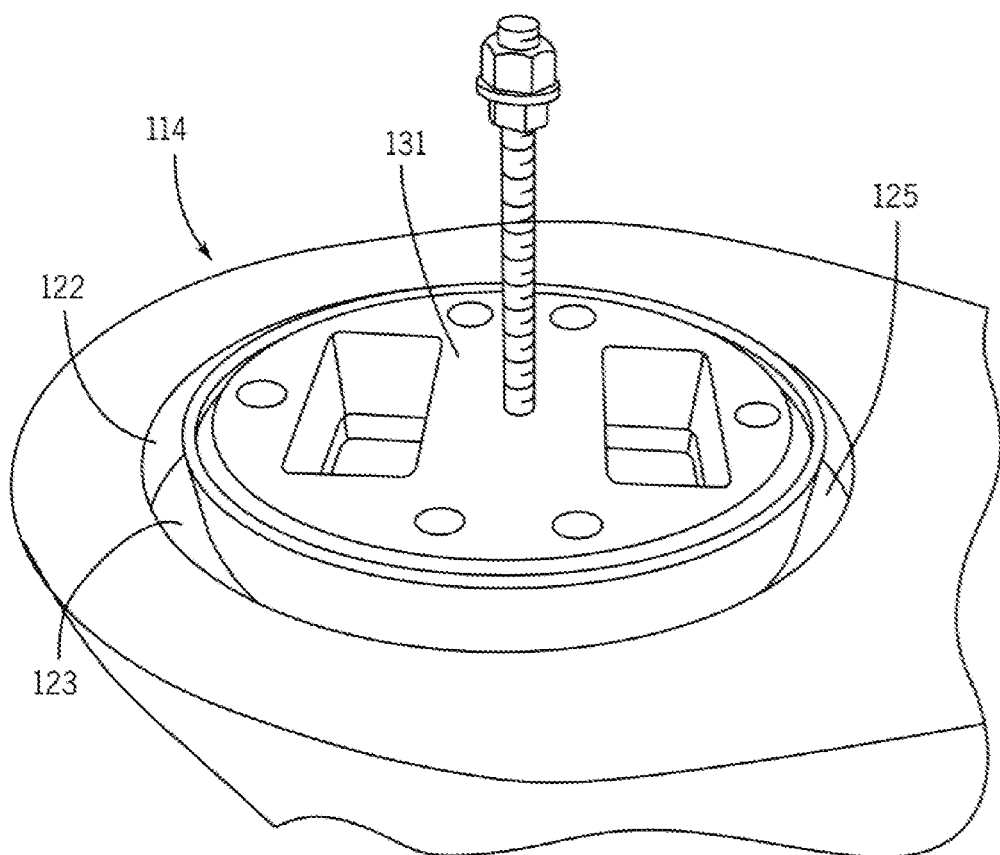
FIG. 8 is a perspective view showing the rim insert of FIG. 7 being installed.

Referring again to FIG. 6B, in a sixth step 118, the subassembly 114 is prepared for insertion into a second mold 120. A rim insert 122 is positioned within the rim 18 of the bowl 16 and is configured to seal the bowl 16 in order to prevent resin from entering the bowl 16 during the injection molding process. FIGS. 7 and 8 show the rim insert 122 being installed in the bowl 16. Referring to FIG. 7, the rim insert 122 includes a first sealing component 123 and a second sealing component 125. The first and second sealing components 123, 125 are configured to be positioned substantially coplanar within the bowl 16, such that an outer periphery 127 of the first sealing component 123 and an outer periphery 129 of the second sealing component 125 cooperate to engage the inner surface of the bowl 16 substantially all the way around. For example, the outer peripheries 127, 129 may define a profile substantially complementary to a profile of the bowl 16 proximate to and below the rim 18. The outer peripheries 127, 129 may form sealing engagement with the inner surface of the bowl 16 and/or with a lower surface of the rim 18. The rim insert 122 includes at least two sealing components 123, 125, such that the sealing components 123, 125 may be separately inserted into the rim 18, which defines a surface area that is smaller than a surface area defined by the combined outer peripheries 127, 129.

Referring to FIG. 8, the rim insert 122 includes a rim insert connector 131 coupled to each of the first and second sealing components 123, 125. The rim insert connector 131 is configured to bring the sealing components 123, 125 into sealed engagement with the bowl 16 and/or the rim 18. The sealed engagement prevents resin from entering into the bowl 16 or other interior portions of the flush engine 12. The rim insert connector 131 may include a member (e.g., threaded rod) configured to be coupled to the second mold 120, such that the rim insert 122 is held in position with respect to the second mold 120 during the molding process and/or the process of inserting the subassembly 114 into the second mold 120.

While FIGS. 6B, 7, and 8 show the rim insert 122 for sealing the bowl 16 during the molding process, according to other exemplary embodiments, the bowl 16 may be sealed in other ways. For example, a diaphragm may be positioned in the bowl similarly to where the rim insert 122 is positioned and then filled until it sealingly engages the inner wall 17 of the bowl 16 or a portion of the rim 18, thereby preventing the resin from passing between the diaphragm and the bowl 16 or the rim 18. According to another exemplary embodiment, the second mold 120 may include one or more male portions that directly and sealingly engage the inner surface 17 of the bowl 16 and/or the rim 18 to prevent resin from passing therebetween. While the rim insert 122 or other structures are discussed with respect to sealing the bowl before introducing a resin, it should further be understood that any of these or other described structures or methods may be used to seal the bowl 16 and/or the rim 18 during the third step 106 in order to prevent the first polymeric material 112 from passing into the bowl 16.

Referring again to FIG. 6B, supports 124 are then removably attached to the rear portion 46 on the subassembly 114, such that the subassembly 114 may hang from the supports 124. For example, the supports 124 may be coupled to the subassembly 114 in the cavities 48. The subassembly is then disposed in a female portion of the second mold 120, such that the forward portion 44 of the subassembly 114 faces down and the rear portion 46 faces up. In this configuration, due to the flow of material due to gravity, if insufficient resin material is provided to the second mold 120, the forward portion 44 and sides of the subassembly 114 will be sufficiently covered with resin, even if the rear surface 50 is not.

The second mold 120 defines a second shape that is the same as a final outer shape of the shell 14. The subassembly 114 may be positioned within the second mold 120, such that a substantially uniform gap is defined between an outer surface of the subassembly 114 and an inner surface of the second mold 120. For example, the gap may be between approximately 0.040 inches and 0.75 inches, or more specifically between 0.125 inches and 0.375 inches. In a seventh step 126, the second mold 120 is closed and a second polymeric material 128 (e.g., a resin) is injected into the female portion of the second mold 120 under pressure, such that the second polymeric material 128 fills in the remaining space in the second mold 120 defined around the subassembly 114. For example, the second polymeric material 128 may cover substantially all of the first polymeric material 112, the upper surface 22 of the flush engine 12, and the rim 18, but may not cover the inner surface of the bowl 16, which is protected by the rim insert 122 during introduction of the second polymeric material 128.

The second polymeric material 128 may be an acrylic, polystyrene (e.g., polyester), urethane, an epoxy composite, or other suitable resin configured to cure as a solid and provide a desired exterior finish to the shell 14. For example, the second polymeric material 128 may be neat or may instead be a filled resin containing up to about 90% filler material. The second polymeric material 128 may be filled with approximately 2% colorant, such that the shell 14 has a colored appearance.

In the seventh step 126, the second polymeric material 128 cures until it is hardened and forms the toilet assembly 10. Referring now to FIG. 6C, in an eighth step 130, the toilet assembly 10 is removed from the second mold 120. The rim insert 122 is removed from the rim 18 and the supports 124 are separated from the toilet assembly 10. After the toilet assembly 10 is removed, in a ninth step 132, the toilet assembly 10 is finished (e.g., polished, sanded, etc.) to provide a smooth finished surface. For example, where the injection molding process leaves a parting line of excess resin where separate portions of the second mold 120 come together, the parting line may be polished or sanded until it is no longer visible.

It should be understood that each first mold 108 and second mold 120 provide a desired outer shape of the toilet assembly 10. For each toilet assembly 10 design, the second mold 120 may correspond with the first mold 108 to provide a substantially constant gap between the foam subassembly 114 formed by the first mold 108 and the inner surface of the second mold 120 when the foam subassembly 114 is positioned therein, thereby providing the layer of second polymeric material 128 having a substantially constant thickness. According to an exemplary embodiment, a variety of first and second molds 108, 120 may be provided with different corresponding mold shapes to provide different final toilet assembly 10 designs. However, each of the first and second molds 108, 120 is configured to receive the same standardized flush engine 12.

While the method shown in FIGS. 6A-8 is directed to a toilet assembly 10 including two polymeric layers overmolded on the flush engine 12, it should be understood that such a process may be used with other plumbing or sanitary fixtures (e.g., toilet tank, bidet, urinal, sink, bath, shower pan, toilet seat, and/or lid, etc.). For example, a standardized tank inner structure, which contains freshwater for flushing, may be used with various toilets having different toilet tank aesthetic designs. The tank inner structure may be formed from vitreous china or other suitable sanitary material as discussed above with respect to the flush engine 12. In the third step 106, the tank inner structure is inserted into the first mold 108 and a foam polymeric layer is applied directly to an outer surface of the tank inner structure. In the sixth step 118, openings in the tank inner structure are sealed in similar ways as the rim 18, described above, and in the seventh step 126, the resin polymeric material is applied to the foam polymeric layer.

Figure 9:
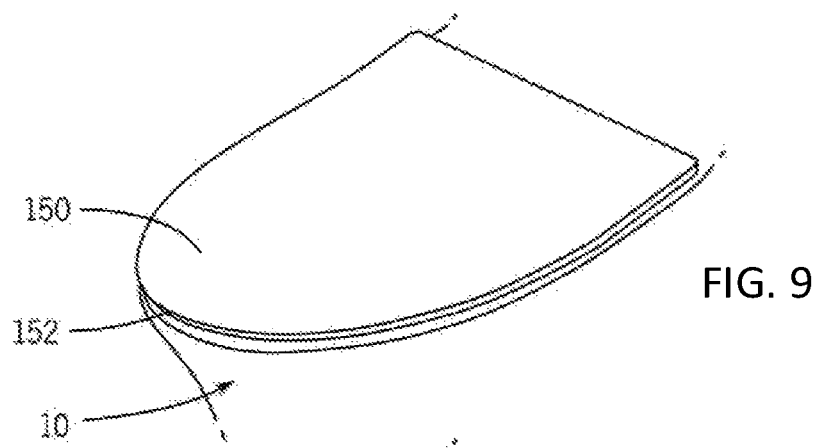
FIG. 9 shows an exemplary embodiment of a toilet assembly with an embedded light source in a non-illuminated condition.
Figure 10:
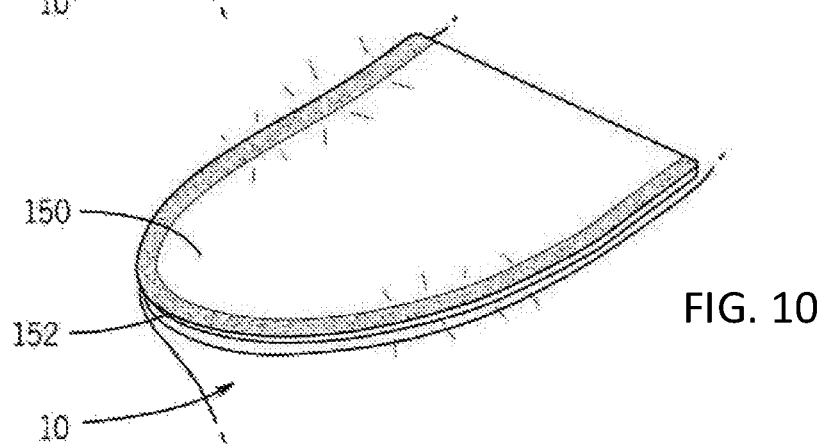
FIG. 10 shows the toilet assembly of FIG. 9 in an illuminated condition.
Figure 11:
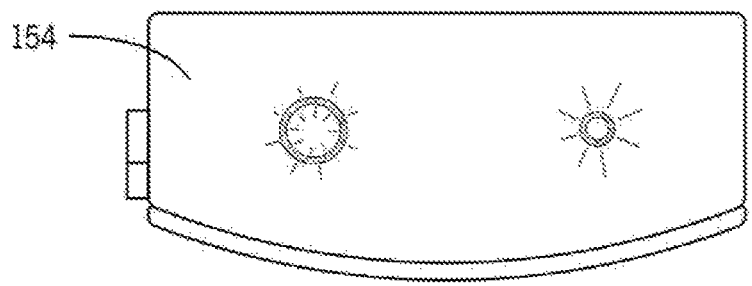
FIG. 11 shows another exemplary embodiment of a toilet assembly with an embedded light source in an illuminated condition.

Referring to FIGS. 9-11, according to an exemplary embodiment, the second polymeric material 128 may be configured to be at least partially translucent, such that light may be transmitted from a light source, through the second polymeric material 128, illuminating portions of the toilet assembly 10. Referring to FIG. 9, portions of a toilet assembly 10 are shown according to various exemplary embodiments. For example, FIG. 9 shows a toilet lid 150 defining an outer periphery 152 and having a resin coating and a light source installed therein and turned to an "off" state. As shown in FIG. 10, a light source is disposed proximate the outer periphery 152 and configured in an "on" state to illuminate the toilet lid 150 at the outer periphery. Such configuration presents a glowing (e.g., halo) effect on the toilet lid 150. According to an exemplary embodiment, the second polymeric material 128 may have enough opacity to conceal the underlying light source from view but to allow light to permeate through the second polymeric material 128.

According to another exemplary embodiment, the light source may be positioned in other locations (e.g., an underside or interior portion) in the toilet lid 150 and reflected and/or refracted toward the outer periphery 152 or other portions of the toilet lid 150, which are desired to be illuminated. In this configuration, the light source may be concealed from view within the toilet lid 150, such that the light illuminates portions of the second polymeric material 128.

According to other exemplary embodiments, the light source may be disposed in other portions of the toilet assembly 10. For example, as shown in FIG. 11, the light source may be disposed on a tank 154 (e.g., at a tank lid or in a tank body), beneath the second polymeric material 128. The tank 154 may include more than one light sources defining different shapes. For example, circles or other shapes having different sizes may correspond to various flush sequences. When a sensor is disposed on the tank 154 or other surface proximate the light source, light passing through the second polymeric material 128 may identify a location for a user to touch in order to control or initiate the flush sequence. While FIG. 11 shows the light source disposed in a toilet lid 150 and a tank 154, according to other exemplary embodiments, the light source may be disposed in various portions of the subassembly 114, such that the light source is concealed from view, but light is passed through the second polymeric material 128. For example, the light source may illuminate portions of a toilet pedestal or portions of other plumbing or sanitary fixtures (e.g., toilet tank, bidet, urinal, sink, bath, shower pan, toilet seat, and/or lid, etc.).

Figure 12:
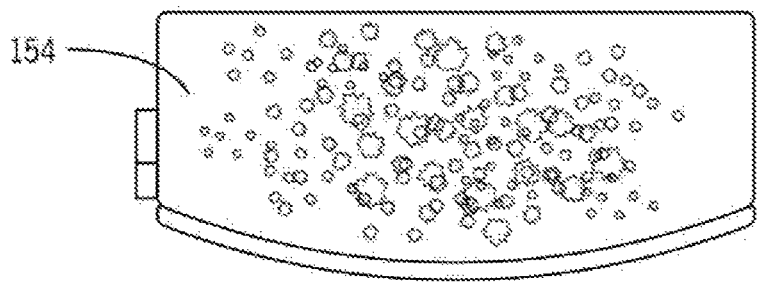
FIG. 12 shows another embodiment of a toilet assembly with an embedded light source in an illuminated condition.
Figure 13A:
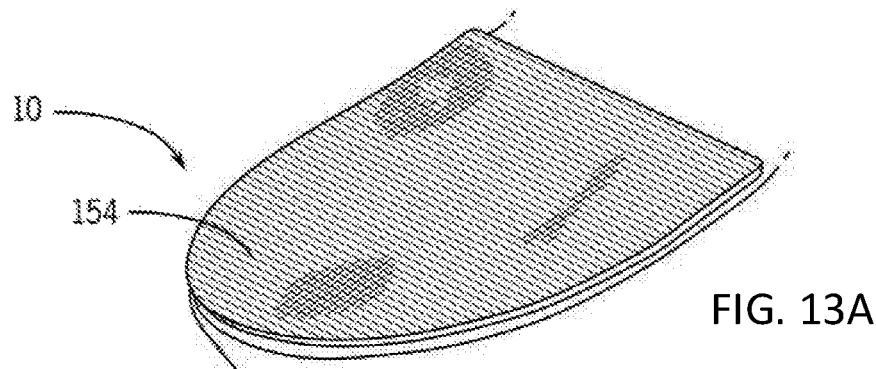
FIG. 13A shows a toilet assembly with textured surfaces according to an exemplary embodiment.
Figure 13B:
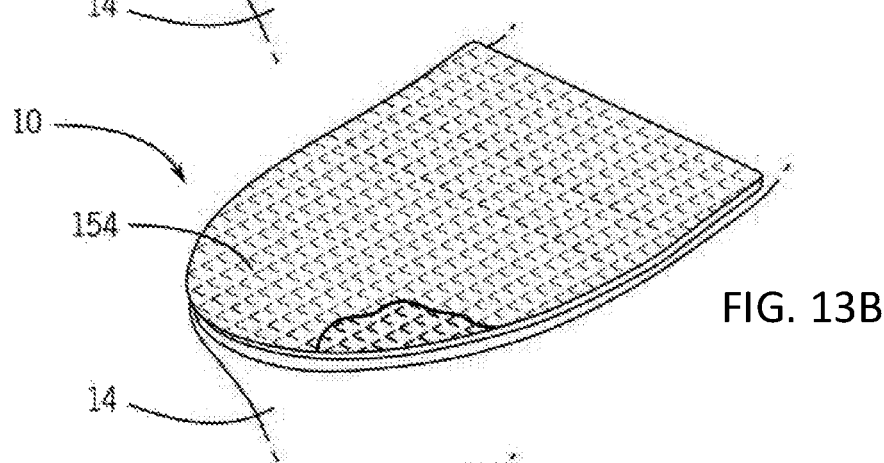
FIG. 13B shows a toilet assembly with textured surfaces according to another exemplary embodiment.
Figure 13C:
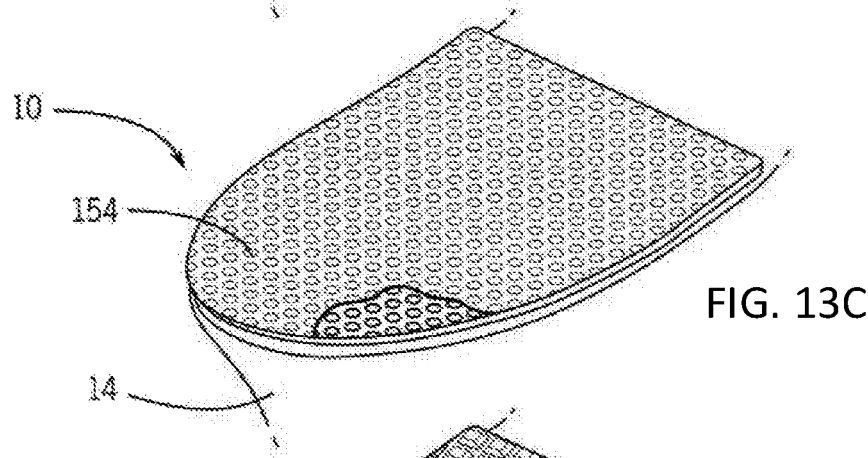
FIG. 13C shows a toilet assembly with textured surfaces according to another exemplary embodiment.
Figure 13D:
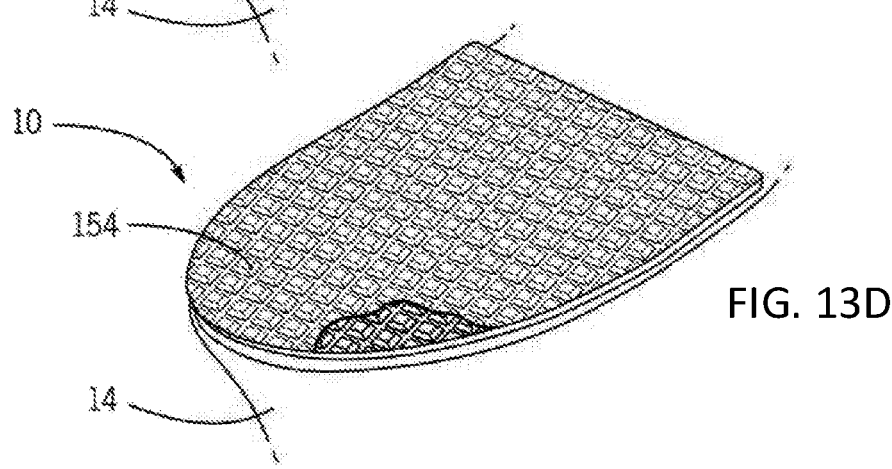
FIG. 13D shows a toilet assembly with textured surfaces according to another exemplary embodiment.

Referring to FIG. 0.12, the light source may also define more complex patterns (e.g., a constellation as shown in FIG. 12). The light source may output a plurality of colors to display a desired pattern. According to another exemplary embodiment, one or more light sources may perform a lighting sequence (e.g., an animation). For example, the one or more light sources may show the constellation in FIG. 12 moving to provide a desired aesthetic effect. The light source may further illuminate the toilet assembly 10 in the dark, providing a night light feature in the bathroom and help a user identify the location of the toilet assembly 10 without turning on ambient lighting in the bathroom. While FIGS. 9-12 show the toilet assembly 10 having a light source for generating light, according to other exemplary embodiments, the toilet assembly 10 may include a luminescent coating below the second polymeric material 128 and configured to absorb light from an external light source and output the light once the light source is turned off. According to another exemplary embodiment, at least one of the first or second polymeric materials 112, 128 may be embedded with a luminescent material.

Referring now to FIGS. 13A-17, toilet assemblies 10 are shown according to various exemplary embodiments. Specifically, FIGS. 13A-13D show toilet assemblies having a shell 14, as discussed above, and a lid 154. Each of the lids 154 shows an example of a different texture, pattern, or fabric appearance. While FIGS. 13A-17 show different textures or fabrics applied to a lid 154, it should be understood that the following features may be applied to first and second polymeric layers on other plumbing or sanitary fixtures described elsewhere in this application.

Figures 14, 15:
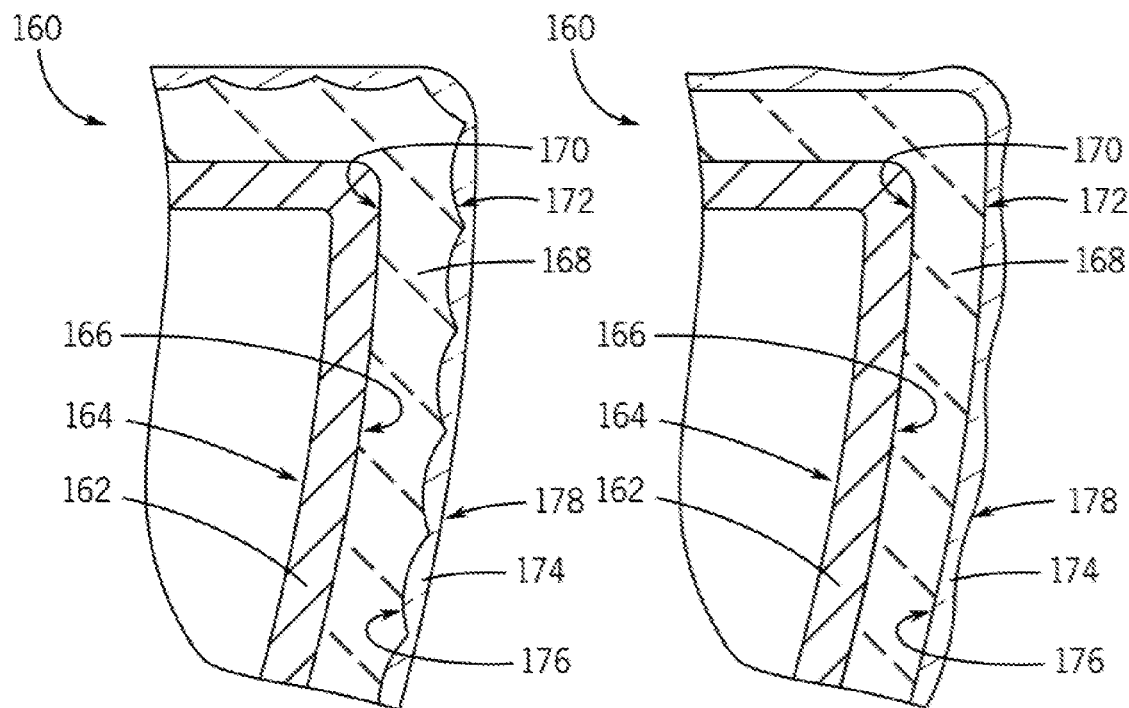
FIG. 14 is a cross-sectional view of a plumbing fixture according to an exemplary embodiment.
FIG. 15 is a cross-sectional view of a plumbing fixture according to another exemplary embodiment.

Referring now to FIG. 14, a cross-sectional view of a portion of a plumbing fixture 160 (e.g., the lid 154 or FIGS. 13A-13D or the bowl 16 of FIGS. 2 and 3) is shown according to an exemplary embodiment. The plumbing fixture 160 includes a base structure 162 formed from a sanitary material (as discussed above) having an inner surface 164 and an opposing outer surface 166. In the configuration in which the base structure 162 is formed from vitreous china, the inner surface 164 is glazed and the outer surface 166 may or may not be glazed. A first polymeric layer 168, substantially the same as the first polymeric layer 112 discussed above, is disposed directly on the outer surface 166 of the base structure 162. The first polymeric 168 includes an inner surface 170 and an opposing outer surface 172. The inner surface 170 of the first polymeric layer 168 engages and is disposed directly on the outer surface 166 of the base structure 162 and has substantially the same surface profile. A second polymeric layer 174, substantially the same as the second polymeric layer 128 discussed above, is disposed on the outer surface 172 of the first polymeric layer 168. The second polymeric 174 includes an inner surface 176 and an opposing outer surface 178. The inner surface 176 of the second polymeric layer 174 engages and is disposed on the outer surface 172 of the first polymeric layer 168 and has substantially the same surface profile. According to another exemplary embodiment, at least a portion of the second polymeric layer 174 is disposed directly on the outer surface 166 of the base structure 162.

As shown in FIG. 14, the inner and outer surfaces 164, 166 of the base structure 162 have smooth surface profiles. However, in order to provide a textured appearance for aesthetic purposes, a textured finish may be provided by one or both of the first and second polymeric layers 168, 174. The outer surface 172 of the first polymeric layer 168 includes a textured, non-planar, surface profile providing a textured appearance. This textured outer surface 172 may be formed from corresponding features defined in an inner surface of the first mold 108. The inner surface 176 of the second polymeric layer 174 forms a complementary surface profile and the outer surface 178 of the second polymeric layer 174 forms a substantially smooth, non-textured surface. In this configuration, the texture of the first polymeric layer 168 is visible through the second polymeric layer 174 due to the transparency of the second polymeric layer 168, but a user does not feel the texture.

Referring now to FIG. 15, the outer surface 172 of the first polymeric layer 168 includes a non-textured surface profile providing a smooth appearance, generally defining the outer shape of the plumbing fixture 160. The inner surface 176 of the second polymeric layer 174 forms a complementary smooth surface profile. However, the outer surface 178 of the second polymeric layer 174 forms a textured, non-planar surface. This textured outer surface 178 may be formed from corresponding features defined in an inner surface of the second mold 120. In this configuration, a user may feel the texture of the second polymeric layer 174.

Figures 16, 17:
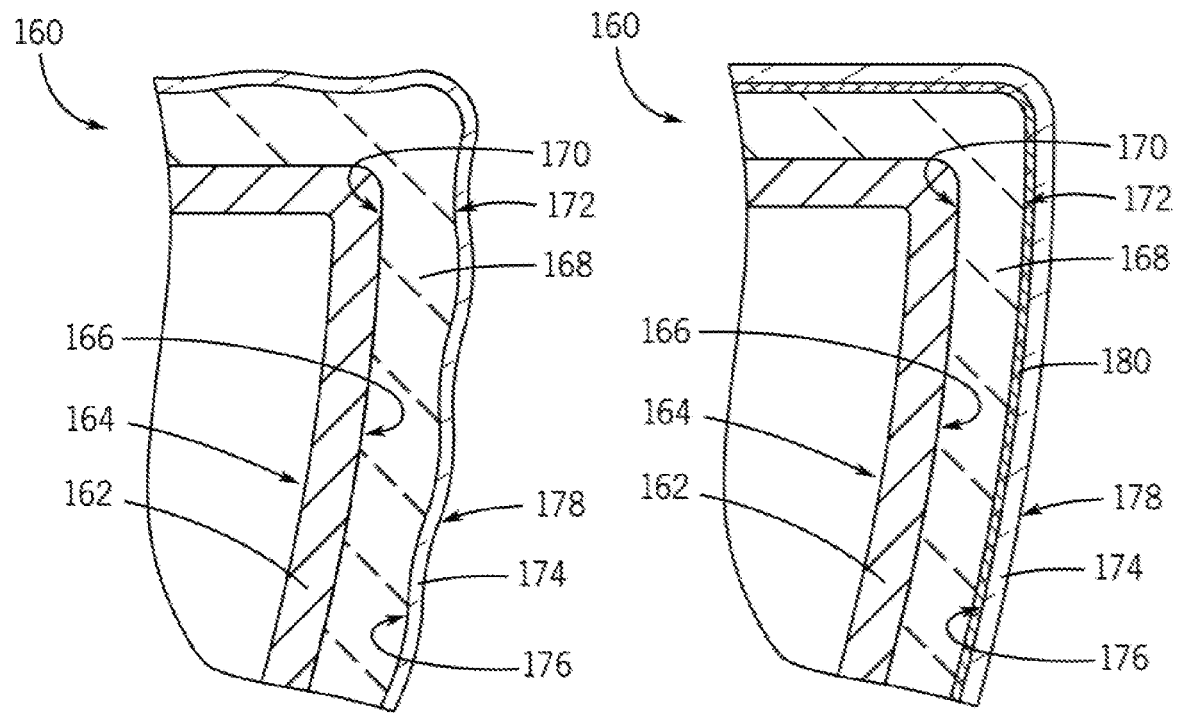
FIG. 16 is a cross-sectional view of a plumbing fixture according to another exemplary embodiment.
FIG. 17 is a cross-sectional view of a plumbing fixture according to another exemplary embodiment.

Referring now to FIG. 16, the outer surface 172 of the first polymeric layer 168 includes a textured, non-planar, surface profile providing a textured appearance. This textured outer surface 172 may be formed from corresponding features defined in an inner surface of the first mold 108. The inner surface 176 of the second polymeric layer 174 forms a complementary surface profile. The outer surface 178 of the second polymeric layer 174 forms a textured, non-planar surface, which is complementary to the surface profile of the outer surface 172 of the first polymeric layer 168. For example, the second polymeric layer 174 may have a substantially constant or variable thickness based on the gap between the outer surface 166 of the first polymeric layer 168 and the second mold 120. This textured outer surface 178 may be formed from corresponding features defined in an inner surface of the second mold 120. In this configuration, a user may feel the texture of the second polymeric layer 174.

Referring now to FIG. 17, plumbing fixture 160 is shown with an intermediate layer 180 disposed between the first polymeric layer 168 and the second polymeric layer 174. The intermediate layer 180 includes a fabric or other material overlaid onto at least a portion of the first polymeric layer 168 and/or the base structure 162. The second polymeric layer 174 is then applied over the intermediate layer 180 and the first polymeric layer 168, sealing the intermediate layer 180 between the first and second polymeric layers 168, 174. Where the intermediate layer 180 defines a texture or a pattern, the second polymeric layer 174 may provide either a smooth outer surface 178 or may provide a textured outer surface 178 corresponding to the texture of the intermediate layer 180.

It should be noted that while FIG. 14-17 show the first and second polymeric layers 168, 174 disposed on only the outer surface 166 of the base structure 162, according to other exemplary embodiments, one or both of the first and second polymeric layers 168, 174 may extend fully around the base structure 162 along both the inner surface 164 and the outer surface 166. For example, an underlying base structure 162 of a lid (e.g., as in lid 154 of FIGS. 13A-13D) may be fully surrounded by the first and second polymeric layers 168, 174. Similarly, a intermediate layer 180 may extend around one or both surfaces 164, 166 of the of the base structure 162 in the configuration described with respect to FIG. 17. According to yet another exemplary embodiment, the plumbing fixture 160 may be formed without a base structure 162, such that the first polymeric layer 168 is formed around a mold rather than around the base structure 162.

Figure 18A:
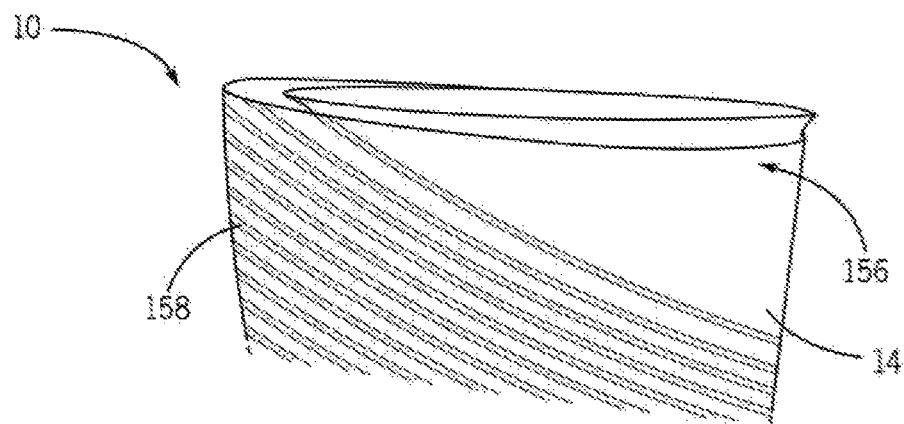
FIG. 18A shows toilet assemblies with surface finishes according to an exemplary embodiment.
Figure 18B:
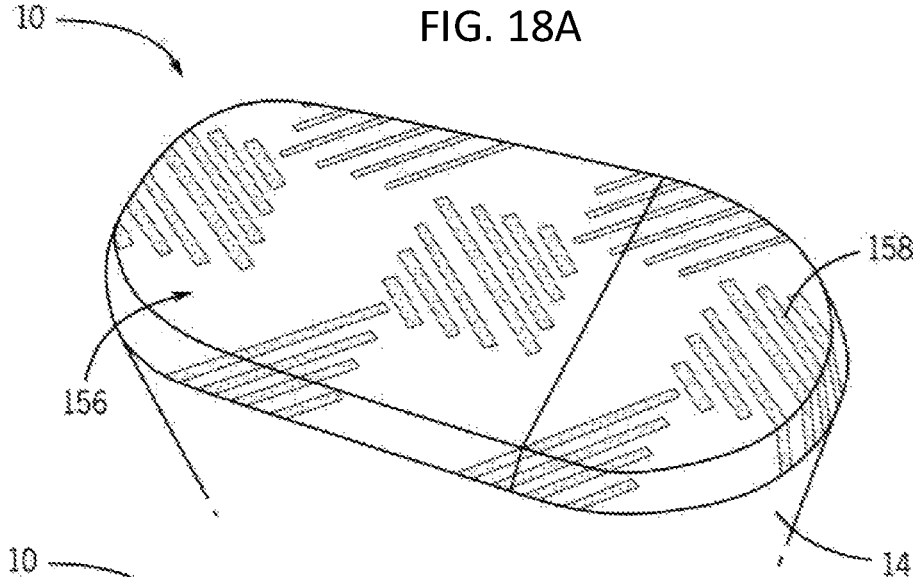
FIG. 18B shows toilet assemblies with surface finishes according to another exemplary embodiment.
Figure 18C:
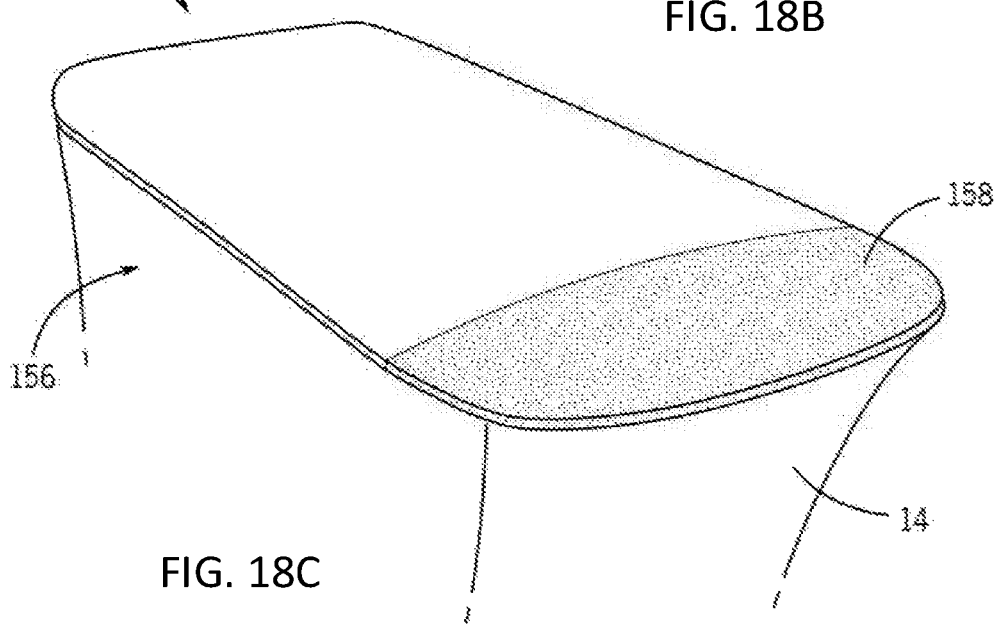
FIG. 18C shows toilet assemblies with surface finishes according to another exemplary embodiment.

Referring now to FIGS. 18A-18C, toilet assemblies 10 are shown having various surface finishes. As shown in FIGS. 18A-18C, the shell 14 may define portions having contrasting finishes (e.g., first portions 156 of the shell 14 may have a generally matte finish and second portions 158 may have a generally glossy or satin finish). During the molding process, portions of the mold may have a matte finish and other portions may have a glossy or satin finish, and the second polymeric layer 128, 174 may take on the characteristics of the mold to create desired patterns or designs.

One embodiment relates to a toilet assembly including a flush engine having a bowl, a sump at a lower portion of the bowl, and a trapway extending from the sump. The toilet assembly further includes a first polymeric layer at least partially surrounding the flush engine, the first polymeric layer comprising a foam. The toilet assembly further includes a second polymeric layer provided on the first polymeric layer, the second polymeric layer comprising resin.

In one aspect of the embodiment, the flush engine is formed from vitreous china.

In another aspect of the embodiment, the flush engine comprises a glazed inner surface.

In another aspect of the embodiment, the flush engine comprises an unglazed outer surface.

In another aspect of the embodiment, the first polymeric layer is disposed directly on the outer surface of the flush engine.

In another aspect of the embodiment, a rim opening is formed proximate a rim of the bowl, and a rim supply line is fluidly coupled to the rim opening and configured to supply water to the bowl. The rim supply line is disposed in the first polymeric layer.

In another aspect of the embodiment, the rim supply line sealingly engages the rim opening.

In another aspect of the embodiment, a sump opening is formed in the sump, and a sump supply line is fluidly coupled to the sump opening and configured to supply water to the sump. The sump supply line is disposed in the first polymeric layer.

In another aspect of the embodiment, the sump supply line sealingly engages the sump opening.

In another aspect of the embodiment, the first polymeric material extends generally coplanar with an upper surface of the flush engine. The second polymeric material is disposed directly on at least a portion of the upper surface of the flush engine.

Another embodiment relates to a plumbing fixture including a base structure having an inner surface comprising a sanitary surface configured to be in contact with waste water and an opposing outer surface. The plumbing fixture further includes a first polymeric layer disposed directly on the outer surface, the first polymeric layer comprising a foam. The plumbing fixture further includes a second polymeric layer provided on the first polymeric layer, the second polymeric layer comprising resin.

In one aspect of the embodiment, the second polymeric layer is at least partially translucent.

In another aspect of the embodiment, a fabric layer is disposed between the first polymeric layer and the second polymeric layer.

In another aspect of the embodiment, an outer surface of the first polymeric layer comprises a textured surface profile.

In another aspect of the embodiment, an outer surface of the second polymeric layer comprises a textured surface profile corresponding to the surface profile of the outer surface of the first polymeric layer.

In another aspect of the embodiment, an outer surface of the second polymeric layer comprises a smooth surface profile.

In another aspect of the embodiment, an outer surface of the first polymeric layer comprises a first portion having a first surface finish and a second portions having a second surface finish different from the first surface finish.

Another embodiment relates to a plumbing fixture including a base structure defining an opening therethrough and a functional insert fluidly coupled a water supply to the base structure at the opening. The plumbing fixture further includes a foam layer disposed directly on the base structure and a resin layer disposed on the foam layer. The functional insert is disposed in the foam layer.

In one aspect of the embodiment, the foam layer is formed directly on the functional insert.

In another aspect of the embodiment, the foam layer defines a channel and the functional insert is received in the channel.

Another embodiment relates to a toilet assembly that includes a pre-formed flush engine that includes a bowl, a sump at a lower portion of the bowl, and a trapway extending from the sump to a drain outlet. One or more polymeric materials at least partially surround the flush engine and may, for example, provide both functional structure (e.g., the rim of the toilet) and aesthetic features (e.g., the external design of the toilet, such as the pedestal design, etc.). In other words, the polymeric materials are a "shell" or "shroud" that conceals portions of the flush engine other than the bowl. According to other exemplary embodiments, the polymeric materials include a foam layer formed around the flush engine and a resin layer formed over the foam layer.

In one aspect of the embodiment, the toilet assembly further includes the epoxy foam layer formed around at least one of a rim supply line or a sump supply line.

Another embodiment relates to a method of forming a toilet assembly, including providing a pre-formed flush engine and inserting the flush engine into a first mold, the first mold defining a first shape substantially similar to and smaller than an outer shape of the toilet assembly. The method further includes injection molding a polymeric material (e.g., an epoxy or other foam) around the flush engine to form a foam subassembly. The method further includes removing the foam subassembly from the first mold and inserting the foam subassembly into a second mold, the second mold defining a second shape substantially the same as the outer shape of the toilet assembly. The method further includes injection molding a resin around the foam subassembly to form the completed toilet assembly. The method further includes removing the toilet assembly from the second mold.

In one aspect of the embodiment, the method further includes polishing the toilet assembly.

Features such as waterways may be separately formed and inserted into the mold prior to the injection molding processes so that the waterways are molded in place relative to the vitreous flush engine.

The present disclosure further relates to plumbing fixtures with electrical components molded therein. For example, the plumbing fixture may be a toilet as described above or other type of fixture. Specifically, the plumbing fixture may be at least one of faucets for sinks, tubs, whirlpools, shower heads, spas, soap dispensers, and the like; faucet handles; water piping or hoses; toilet components (e.g., seat, seat lid, tank, tank lid, bowl, etc.); shower enclosures; or water containers such as sinks, bathtubs, whirlpools, spas, etc. The plumbing fixture, into which is molded the electrical component, may be fabricated using at least one of a low-corrosive metal or metal alloys (e.g., tungsten, titanium, chrome, pewter, copper, bronze, brass, stainless steel, zinc alloys), ceramic (e.g., porcelain), treated ceramic (e.g., vitreous china), glass, plastic, or combinations thereof. The electrical components may be at least one of circuit boards, light emitting diodes (LEDs), sensors, actuators, wiring, heating elements, switches, controllers, power sources, pumps, magnets, or a combination thereof.

The electrical components may be molded into (i.e., embedded within) the plumbing fixture using at least one of insert molding, injection molding, blow molding, compression molding, extrusion molding, gas assist (i.e., gas injection) molding, rotational molding, structural foam molding, thermoforming, matrix molding, or transfer molding. Materials which may be used to support the electrical components at least partially within the plumbing fixture include epoxy resin (e.g., bisphenol A, bisphenol F, novolac, aliphatic, glycidylamine, etc.); adhesives; elastomers; or polymers (e.g., nylons, polyethylene, polypropylene, polystyrene, polyurethane, polyvinyl chloride, etc.), as discussed above. In one embodiment, epoxy resins are reacted (i.e., cross-linked) at elevated temperatures either with themselves through catalytic homopolymerization, or together with at least one co-reactant (i.e., hardeners or curatives) selected from the following: polyfunctional amines (e.g., cycloaliphatic amine, aromatic anime, aliphatic amine, amidoamine); anhydrides (e.g., acid anhydrides, cyclic anhydrides); phenols; alcohols; thiols; phenalkamines; polyamides; or combinations and/or derivatives thereof (e.g., aliphatic amine adducts).

The molding material may include an additive to enhance physical properties such as strength, mechanical stability, etc. or alter the color or opacity. For example, in some embodiments, the additive may include aluminum trihydroxide (to reduce shrinkage, add weight and add fire retardancy); fumed silica thixotropic powder (to alter viscosity properties); glass bubbles (to bulk-out or thicken molded systems, reducing their density and making them easier to mechanically sand); milled carbon fiber (to improve strength, dimensional stability and electrical conductivity); graphite powder (a friction reducer for enhancing abrasion resistance); quartz granules (to improve chemical resistance, durability, slip resistance and high impact resistance properties); or a combination thereof. Colorants which may be added to the molding material include titanium nitride (TiN) (having a gold appearance), zirconium nitride (ZrN) (having a brass-like appearance), titanium carbide (TiC) (having a black appearance), titanium carbonitride (TiCN) (having a blue-grey appearance), titanium dioxide ($TiO_2$) (having a white appearance), titanium aluminum nitride (TiAlN) (having a violet-bronze appearance), or a combination thereof. In one implementation, the molding material includes quartz granules and a titanium dioxide colorant.

According to an exemplary embodiment, electrical components may be molded into the plumbing fixture using insert molding wherein an insert (e.g., the electrical component) is included in a cavity of a mold, and then molding material is added (e.g., via injection or extrusion) and allowed to flow throughout the cavity and around the insert. In circumstances where the molding material is not configured for injection or extrusion, the molding material may initially experience elevated temperatures above its melting point to increase flowability. After addition of the molding material to the cavity, the molding material is solidified to secure the insert in the cavity such that at least a portion of the insert is embedded in the mold. In this manner, the insert is anchored more securely than if it were assembled to a previously molded component while still retaining functionality of the electrical component, a top surface of which may be positioned below, in line with, or above an edge surface of the plumbing fixture.

Figure 19:
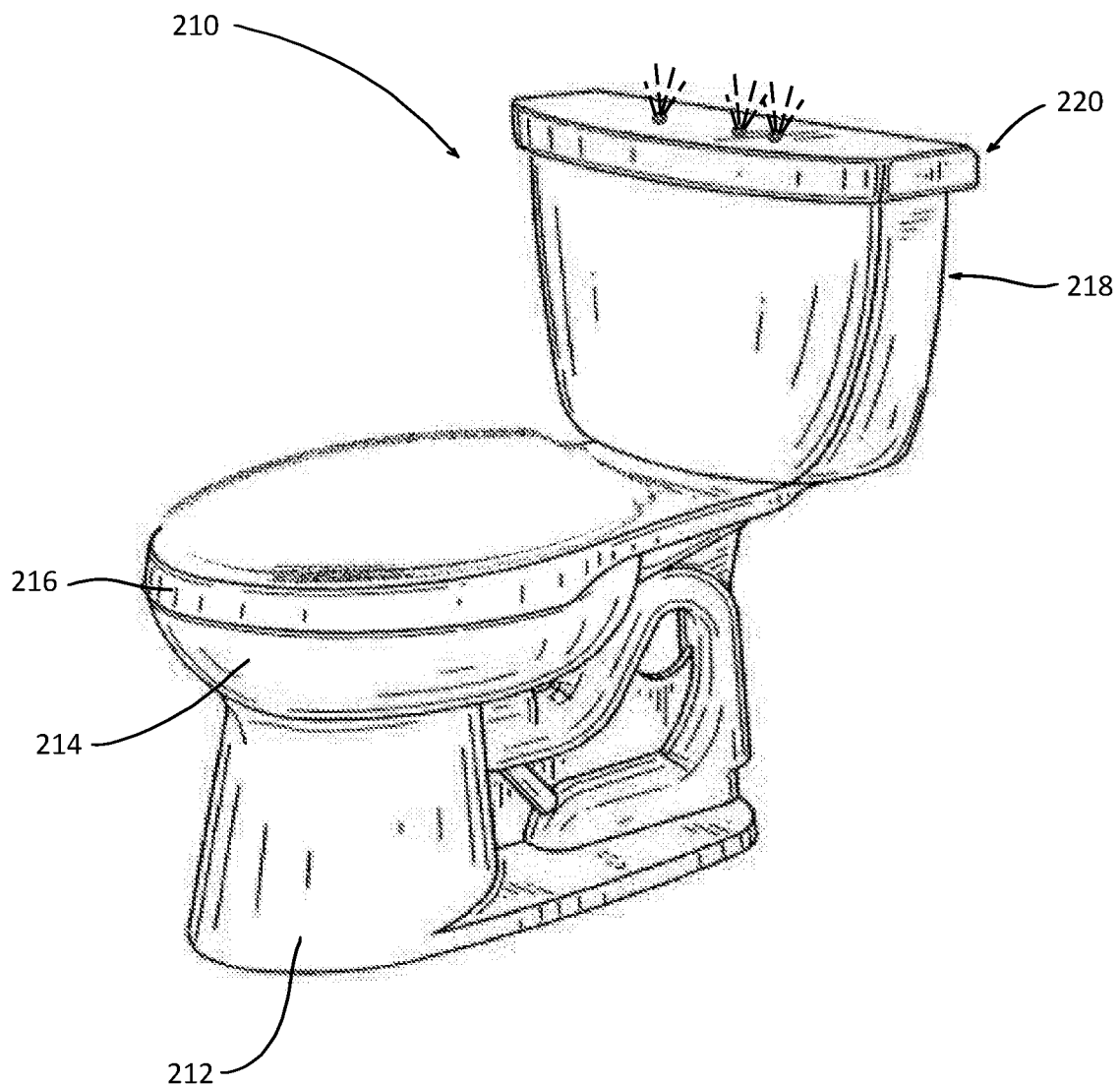
FIG. 19 is a perspective view of a toilet according to an exemplary embodiment.

Referring now to FIG. 19, a plumbing fixture is shown according to an exemplary embodiment. In particular, FIG. 19 shows the plumbing fixture as a toilet 210 having an insert-molded electrical component installed therein. The toilet 210 includes a pedestal 212 having a bowl 214 extending downward from a rim 216 of the pedestal 212 and a tank 218 extending upward from the rim 216. The tank 218 may be separately formed from the pedestal 212 and coupled to the pedestal 212 or may be integrally formed with the pedestal 212. The toilet 210 further includes a removable tank cover 220 disposed on the tank 218 and configured to enclose an interior portion of the tank 218 and to provide access thereto in order to service a flush engine disposed in the tank 218. According to another exemplary embodiment, the tank cover 220 may be integrally formed with the tank 218, such that the interior portion of the tank 218 is accessible in other ways.

Figure 20:
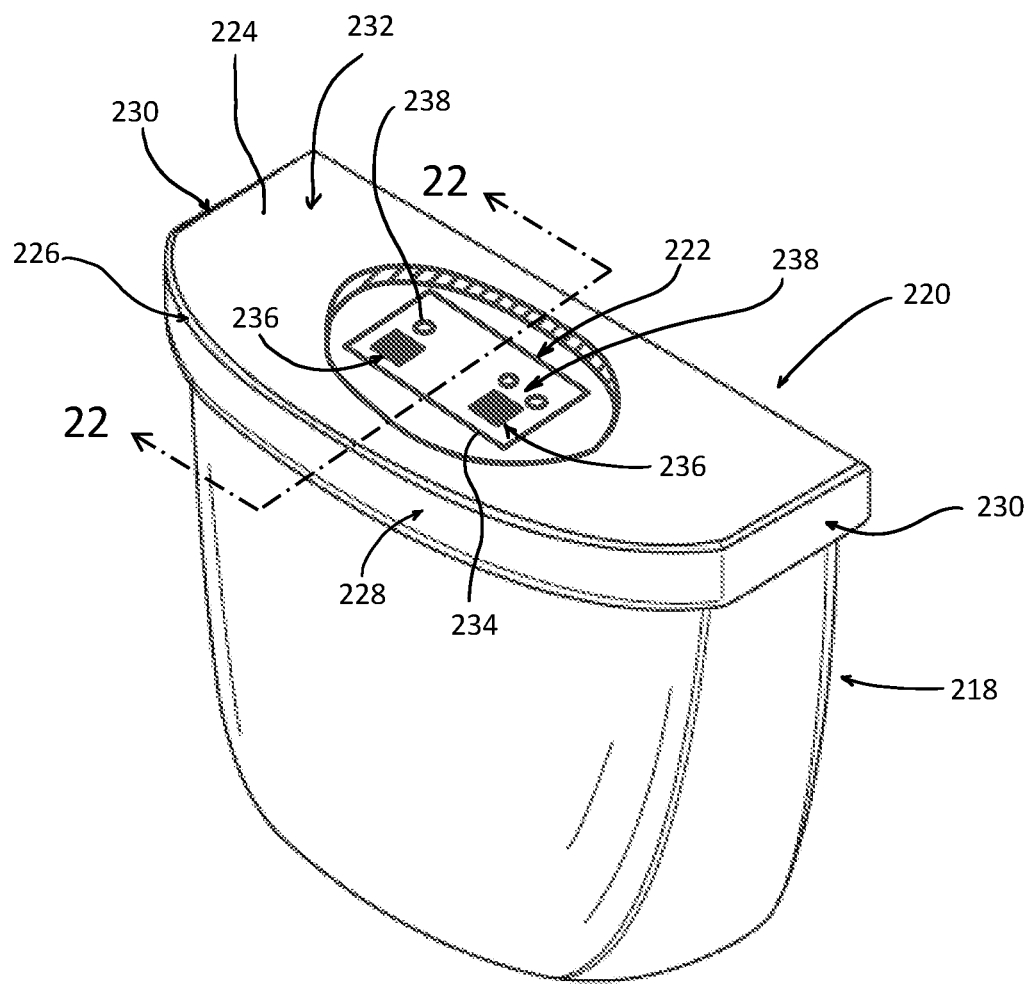
FIG. 20 is close up view of the tank of FIG. 1, showing an electrical component installed therein.

Referring now to FIG. 20, an electrical component 222 is installed in the tank cover 220. In FIG. 20, a portion of the tank cover 220 is cutaway to show the electrical component 222 disposed below the outer surface 226. The tank cover 220 includes an epoxy body 224 (or any other suitable material, as discussed above) having an outer surface 226, which includes a forward surface 228 extending laterally toward the bowl 214, opposing side surfaces 230 extending rearward from the forward surface 228 and disposed on the tank 218, and an upper surface 232 extending between the forward surface 228 and the side surfaces 230 and facing upward when the tank cover 220 is installed on the tank 218. In the configuration shown in FIG. 20, the electrical component 222 is molded directly into the tank cover 220, proximate the upper surface 232. However, it should be understood that according to other exemplary embodiments, the electrical component 222 may be installed in other portions of the tank cover 220 or of the toilet 210.

Figure 21:
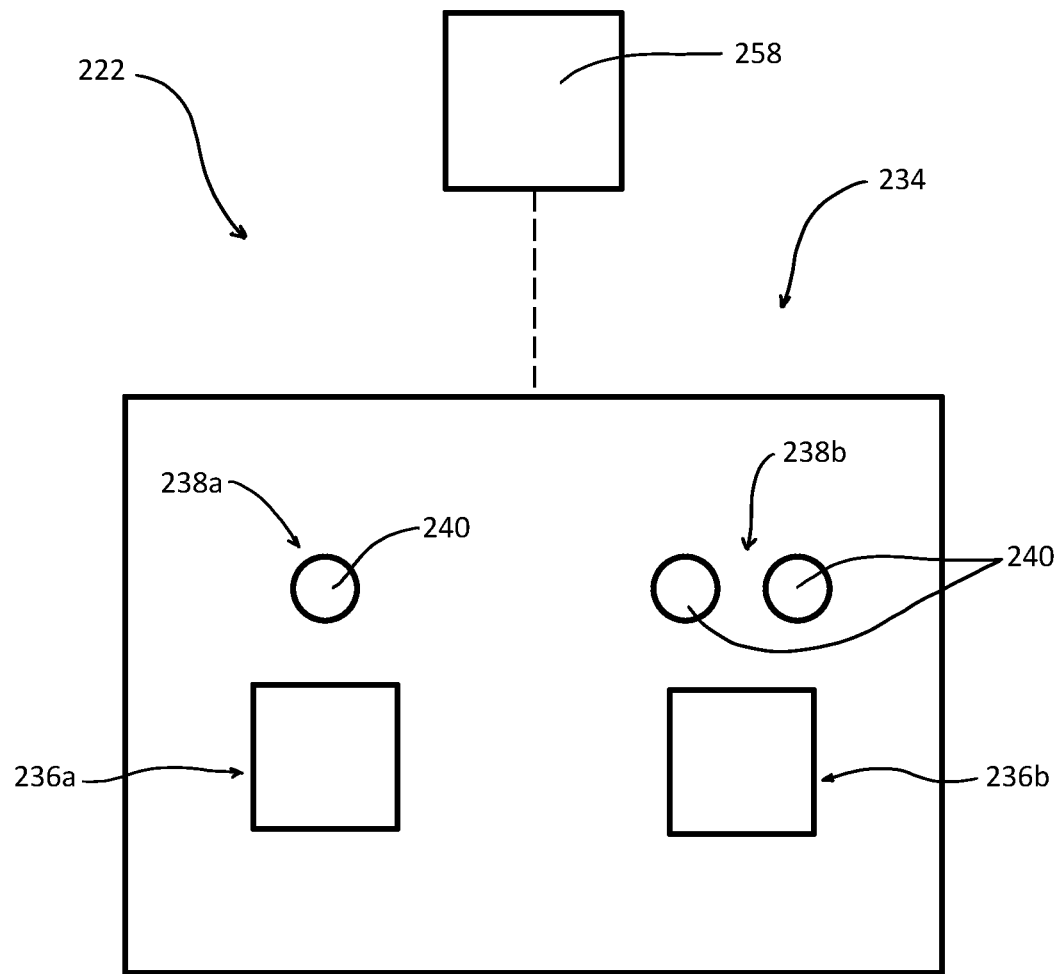
FIG. 21 is a schematic view of an electrical component according to an exemplary embodiment.

Referring to FIGS. 20 and 21, the electrical component 222 is shown according to an exemplary embodiment. The electrical component 222 includes a circuit 234 having at least one sensor 236 and at least one light source 238 disposed proximate the at least one sensor 236. For example, the circuit 234 in FIG. 20 includes a plurality of sensors 236 and a plurality of light sources 238. In this configuration, the circuit 234 may be configured to provide two or more different actuation sequences for the toilet 210 (e.g., as a dual-flush toilet). As shown in FIG. 21, a first sensor 236a is disposed proximate a first light source 238a, which includes one light 240 (e.g., an LED). A second sensor 236b is spaced apart from the first sensor 236a and is disposed proximate a second light source 238b, which is different from the first light source 238a. For example, the second light source 238b may include two or more lights 240, or may provide a different color or size light 240 relative to the configuration of the first light source 238a. The electrical component is configured to be coupled to a power source (e.g., an outlet, battery, etc.) which is either embedded in the tank cover 220 (e.g., insert-molded) or external to the tank cover 220. For example, the power source may be disposed in the tank 218 or in another portion of the toilet 210.

Figure 22:
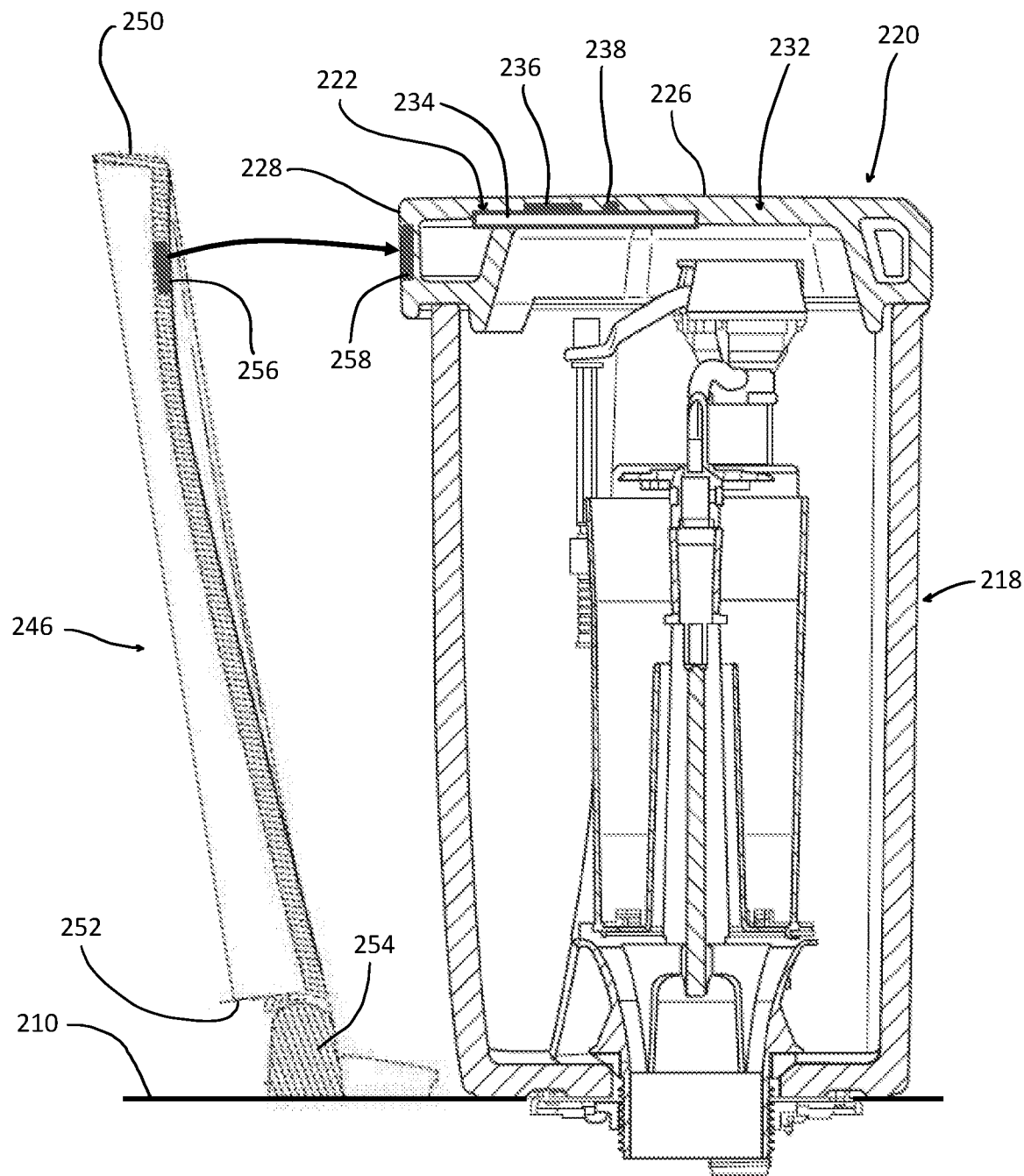
FIG. 22 is a cross-sectional view taken across line 22-22 of FIG. 20, with a light source in an "off" configuration.
Figure 23:
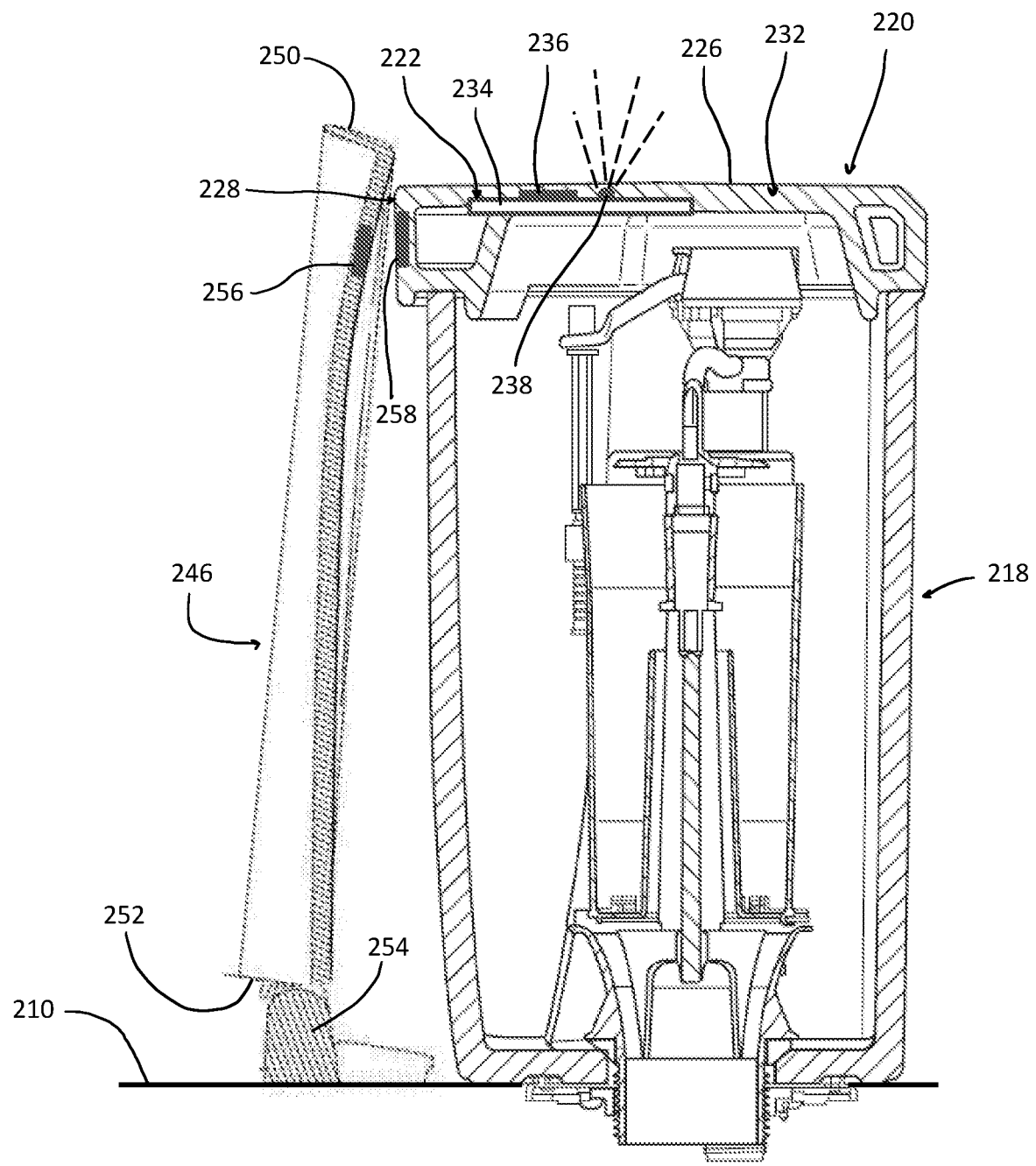
FIG. 23 is a cross-sectional view taken across line 22-22 of FIG. 20, with the light source in an "on" configuration.

Referring to FIGS. 22 and 23, the circuit 234 is disposed offset from and below the outer surface 224 of the tank cover 220, such that the sensors 236 and the light sources 238 are disposed below the outer surface 224 as well, even though each may extend upward from the circuit 234. By completely concealing the circuit 234, the sensors 236 and the light sources 238 within the tank cover 220, each of the components are isolated from water in the tank 218, reducing the risk of water damage to the components and malfunctioning of the toilet 210. The tank cover 220 is formed from a semi-translucent material defining an opacity, such that the circuit 234, the sensors 236, and the light sources 238 are concealed from view when the light sources 238 are in an "off" configuration. During operation of the toilet 210, the light sources 238 either selectively or permanently are switched to an "on" or "illuminated" configuration, such that light emanates from the light sources 238 and passes through the tank cover 220 to the outer surface 224. In the "on" configuration, light is visible to a user on the outer surface 224, but the circuit 234, the sensors 236, and the light sources 238 themselves remain concealed from view by the user.

According to an exemplary embodiment, each of the sensors 236 are touchless sensors, which may be projected capacitive sensors, microwave sensors, electromagnetic sensors, or other type of sensor capable of detecting an object without requiring an optical path (e.g., a line of sight) between the sensor 236 and the object. The sensors 236 may project corresponding electromagnetic fields or microwave emissions through the optically opaque surface of the tank cover 220 and into a detection region 244 outside the tank 218. For example, the detection region or regions 244 may be above the tank cover 220. Upon detecting an object in a certain detection region 244, the corresponding sensor 236 sends a signal to the circuit 234 indicating that an object is detected. The circuit 234 then processes the signal and sends instructions to a motor assembly to actuate an appropriate flush sequence based on the signal received by the circuit 234. The motor assembly may be connected to a flush valve 242 (e.g., a valve ball. "flapper" or canister-style valve) within the tank 218 via a chain or other coupling link. Rotation of the motor assembly opens the flush valve 242 and results in actuating a flush sequence for the toilet 210.

In the dual-flush configuration shown in FIGS. 20 and 21, a user may separately actuate two different flush sequences based on a placement of an object (e.g., a user's hand) relative to the electrical component 222. A first detection region 244a is defined proximate both the first sensor 236a and the first light source 238a. Specifically, the first sensor 236a and the first light source 238a are disposed close enough to each other, such that when a user places an object proximate the first light source 238a, the first sensor 236a is able to sense the presence of the object in the first detection region 244a and sends a signal to the circuit 234 indicating the presence of the object. The circuit 234 then instructs the motor assembly to actuate the flush valve 242 to release a first pre-determined amount of water into the bowl 214 for flushing. The colocation of the first sensor 236a and the first light source 238a in the same first detection region 244a is important because it ensures that the user can reliably actuate the flush sequence, even though the user may only see the light emanating from the first light source 238a rather than the first light source 238a or the first sensor 236a themselves.

Similarly to the first detection region 244a, a second detection region 244b is defined proximate both the second sensor 236b and the second light source 238b and operates substantially the same as the first detection region 244a, discussed above. When the second detection region 244b senses the presence of an object, it sends a signal to the circuit 234 indicating the presence of the object, which then instructs the motor assembly to actuate the flush valve 242 to release a second pre-determined amount of water, different from the first amount of water, into the bowl 214 for flushing. The amount of water in each flush sequence may correspond to the size and/or quantities of lights 240 in each of the light sources 238. For example, if the second light source 238b includes a larger or more lights 240 than the first light source 238a, the second amount of water may be greater than the first amount of water.

Referring to FIGS. 22 and 23, a lid 246 is positioned on the toilet 210 proximate the tank 218. The lid 246 defines an upper surface 248 configured to face upward when the lid 246 is in a "lowered" position, covering the bowl 214, and configured to face the forward surface 228 of the tank cover 220 when the lid 246 is in a "raised" position when the toilet 210 is in use. The lid 246 further defines a forward edge 250, an opposing rear edge 252, and a hinge 254 at the rear edge 252, about which the lid 246 rotates (e.g., pivots) between the raised and lowered positions. As shown in FIGS. 22 and 23, the lid 246 includes a magnet 256 disposed below the upper surface 248, proximate the forward edge 250. According to an exemplary embodiment, the lid 246 may be formed from an epoxy or other suitable material, similarly to the tank cover 220, and the magnet 256 is insert molded into the lid 246. In this configuration, the magnet 256 is concealed from view within the lid 246. However, it should be understood that the magnet 256 may be coupled to the lid 246 in other ways.

Referring again to FIG. 21, a lid sensor 258 is coupled to the circuit 234 and sends a signal to the circuit 234 indicating a position of the lid 246. As shown in FIG. 22, the lid sensor 258 may be disposed in the forward surface 228 of tank cover 220. It should be understood that, while FIG. 22 shows the lid sensor 258 in the forward surface 228, the lid sensor 258 may be in other surfaces of the tank cover 220 or in the tank 218 itself. The lid sensor 258 senses whether the lid is in a raised or lowered position. For example, the lid sensor 258 may be an electromagnetic sensor configured to detect the proximity of the magnet 256 to the lid sensor 258. As shown in FIG. 23, when the lid 246 is raised until it is resting against the tank 218 or the tank cover 220, the magnet 256 is disposed proximate the lid sensor 258, which then senses the presence of the magnet 256. The lid sensor 258 then sends a signal, either through physical connection or wirelessly (e.g., Bluetooth), to the circuit 234, indicating that the lid 246 is in the raised position and the circuit 234 instructs the light sources 238 to illuminate the lights 240. In this configuration, the lights 240 turn on when the lid 246 is raised and may turn off when the lid 246 is moved away from the lid sensor 258 toward the lowered position. When the lid 246 is lowered, the lid sensor 258 either sends a signal to the circuit 234 indicating that the magnet 256 is no longer present, or stops sending the signal that the magnet is present 256. The circuit 234 then instructs the light sources 238 to turn off. According to an exemplary embodiment, the circuit 234 may include a time delay after the lid sensor 258 no longer senses the presence of the magnet 256, such that the light sources 238 remain on for a pre-determined period of time after the lid 246 is lowered. In this configuration, a user may lower the lid 246 before actuating the flush sequence because the user can still identify the location of the detection regions 244 when the light sources 238 remain on for a period of time after the lid 246 has been lowered.

While FIGS. 22 and 23 show the lid sensor 258 as an electromagnetic sensor, according to other exemplary embodiments, the lid sensor 258 may be other types of sensors, such as projected capacitive sensors, microwave sensors, or other types of sensors (e.g., similarly to the sensors 236 discussed above), capable of detecting an object without requiring an optical path. In this configuration, the lid sensor 258 may not require the presence of a magnet 256 in the lid 246 in order for the lid sensor 258 to detect the position of the lid 246. As a result, the lid 246 may be interchangeable with a conventional lid 246, which may or may not be molded in the ways described above. In each of the foregoing configurations, the lid 246 is passive and does not have any active electronic components disposed therein. As a result, the seat assembly, including the lid 246 may be easily removed without having to disconnect any wires. According to yet another exemplary embodiment, the lid sensor 258 may be disposed in the hinge 254 and may determine the position of the lid 246 based on the rotation in the hinge 254 rather than or in addition to the proximity of the lid 246 to the tank cover 220.

While FIGS. 19-23 show the electrical component 222 used for a dual-flush toilet 210 by providing different lights 240 for each flush type, it should be understood that the electrical component 222 may display other information. For example, the toilet 210 may include an automated or automatic cleaning cycle, which introduces a supply of cleaning solution in the tank 220 or other portion of the toilet 210 into the bowl 214 during a flush sequence or other time for cleaning. In this configuration, the electrical component 222 may display to the user, using the light source 238, the option to activate the cleaning cycle. By interacting with the sensor 236 proximate the light source 238, the user may then cause the cleaning cycle to commence. According to another exemplary embodiment, the light source 238 may display the condition of the supply of cleaning solution, including when the supply (e.g., in a cleaning solution reservoir) is low and needs to be refilled. In this configuration, the electrical component 222 may not require the sensor 236 for interacting with the user. However, according to another exemplary embodiment, the user may be able to clear notifications from the light source 238 by interacting with the sensor 236.

According to another exemplary embodiment, the electrical component 222 may be insert-molded into a tankless toilet 210. The electrical component 222 may be embedded within the pedestal 212 below the rim 216, such that light from the light source 238 emanates through the pedestal 212 and displays on the rim 216. In this configuration, at least a portion of the pedestal 212 (e.g., proximate the rim 216), where the electrical component 222 is located is formed from epoxy or other suitable semi-translucent material, as discussed above. According to another exemplary embodiment, a flush actuator may be installed in a wall and configured to flush the toilet. The electrical component 222 is formed from the epoxy or other material to match the appearance of the toilet 210 and conceal the presence of the electrical component. The electrical component 222 may include a lid sensor 258 positioned in the wall and configured to sense when the lid 246 is raised. The light source 238 positioned in the electrical component 222 in the wall then illuminates, as discussed above.

While FIGS. 19-23 show the electrical component 222 installed in a tank cover 220 for a toilet 210, according to other exemplary embodiments, an electrical component 222 having a sensor 236 and a light source 238 may be insert molded into other plumbing fixtures formed from epoxy or other suitable material capable of transmitting light from the light source 238 to an outer surface thereof. For example, the electrical component 222 may be installed in a sink basin, bidet, shower enclosure, bathtub, or other plumbing fixture formed from the epoxy or other suitable material described above.

Figure 24:
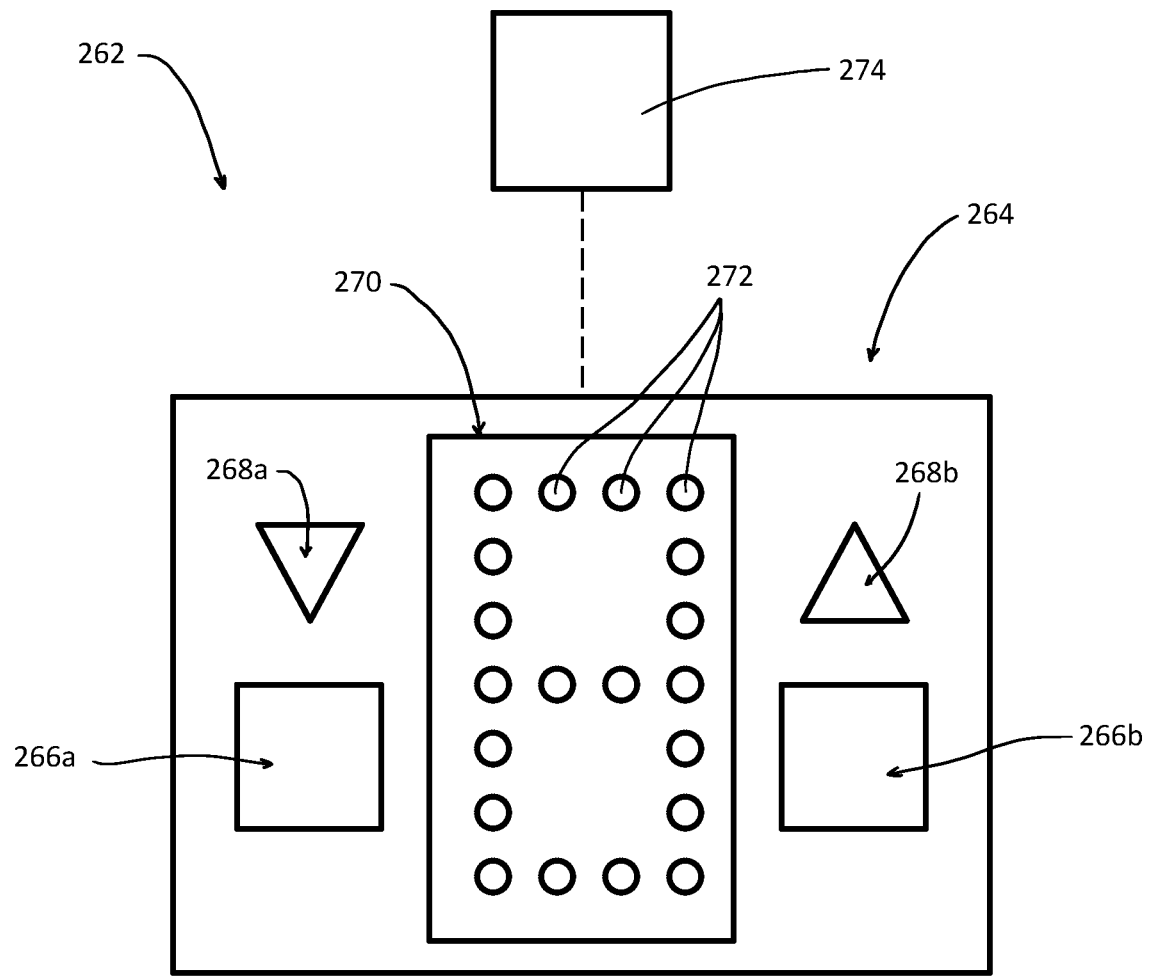
FIG. 24 is a schematic view of an electrical component according to another exemplary embodiment.

Referring to FIG. 24, a schematic view of an electrical component 262 is shown according to another exemplary embodiment. The electrical component 262 includes a circuit 264, at least one sensor 266, and at least one light source 268, which are substantially similar to the circuit 234, sensor 236, and light source 238 discussed above. Specifically, the electrical component 262 includes a first light source 268a corresponding to a first sensor 266a and a second light source 268b corresponding to a second sensor 266b. The electrical component 262 further includes a display 270 (e.g., a third light source) installed on the circuit 264. The display 270 may be substantially the same as a light source 268 and may be formed from a plurality of lights 272 similar to the lights 240, which are arranged and configured to display a message to a user. For example, the plurality of lights 270 are arranged to form an outline of one or more letters or numbers. According to another exemplary embodiment, the display 270 may be a screen, which is configured such that the contents of the screen emanate through the epoxy layer but the display 270 itself is not visible to a user.

According to an exemplary embodiment, the display 270 of the electrical component 262 is configured to display a temperature or other information (e.g., the time) to a user. For example, the display 270 may indicate a temperature of water in or being introduced into the plumbing fixture. The circuit 264 may be electrically connected, either physically or wirelessly, to a controller 274 configured to adjust the temperature of water being introduced into the plumbing fixture (e.g., at a mixing valve in a faucet). The first light source 268a indicates a first function for lowering the temperature of the water, such that the first sensor 266a sends a signal to the controller 274 to lower the temperature of the water. The first light source 268a may have a shape (e.g., downward triangle) or color (e.g., blue) that indicates making a water supply colder. Similarly, the second light source 268b indicates a second function for raising the temperature of the water, such that the second sensor 266b sends a signal to the controller 274 to raise the temperature of the water. The second light source 268b may have a shape (e.g., upward triangle) or color (e.g., red) that indicates making the water supply warmer. The temperature shown on the display 270 then adjusts to show either the desired temperature by the user or the actual temperature of the water.

While FIG. 24 shows an electrical component 262 for actively controlling water in a plumbing fixture, according to other exemplary embodiments, the electrical component 262 may be a passive system, which couples the display 270 to a sensor and displays information (e.g., a temperature, cleaning condition, etc.) based on an input from the sensor. In this configuration, the electrical component 262 may not include other light sources 268 or corresponding sensors 266 for actively controlling a feature in the plumbing fixture.

According to another exemplary embodiment, the electrical component 262 may be provided for controlling water in the plumbing fixture with or without the display 270. For example, the sensor 266 may be configured to sense a user's hands or presence in the plumbing fixture and activate a faucet to introduce water to the plumbing fixture. One or more light sources 268 may be configured to guide a user where to place his or her hands in order to activate the sensor 266 to introduce water. In this configuration, the plumbing fixture operates similarly to an automatic faucet.

According to another exemplary embodiment, the electrical component 262 may be provided for controlling other electrical features. For example, the electrical component 262 may control ambient lighting in the plumbing fixture. Specifically, the electrical component 262 may allow the user to change or select one or more of a color of lighting, an "on" or "off" condition of the lighting, an intensity of the lighting, a lighting sequence, etc.

According to another exemplary embodiment, the electrical component 262 may be provided for controlling draining a plumbing fixture. The electrical component 262 may be electrically connected to an actuator configured to close and open a drain opening. For example, the actuator is coupled to a drain stopper and moves the drain stopper between a raised position spaced apart from the drain opening and a lowered position disposed against and sealing the drain opening. Based on the user's interaction with the electrical component 262, the electrical component 262 sends a signal to the actuator to instruct the actuator to move the drain stopper to the desired position.

According to another exemplary embodiment, the electrical component 262 may be provided for controlling a speaker (not shown) or other auxiliary electrical components. For example, the plumbing fixture may include a speaker embedded (e.g., insert-molded) therein. A user may interact with the electrical component 262 in order to operate the speaker. For example, when a user interacts with the one or more sensors 266, the circuit 264 sends instructions to the speaker to change a volume, music or sound source (i.e., input), track, station, etc. According to an exemplary embodiment, the speaker may form a part of the electrical component, such that the speaker is disposed on or proximate the circuit 264. According to other exemplary embodiments, the speaker may be positioned in the plumbing fixture at a remote location from the circuit 264. According to yet another exemplary embodiment, the speaker may be insert-molded in the plumbing fixture, such that the speaker is fully enclosed within an interior portion of the plumbing fixture. In this configuration, the speaker may be protected from damage due to the presence of water.

Figure 25:
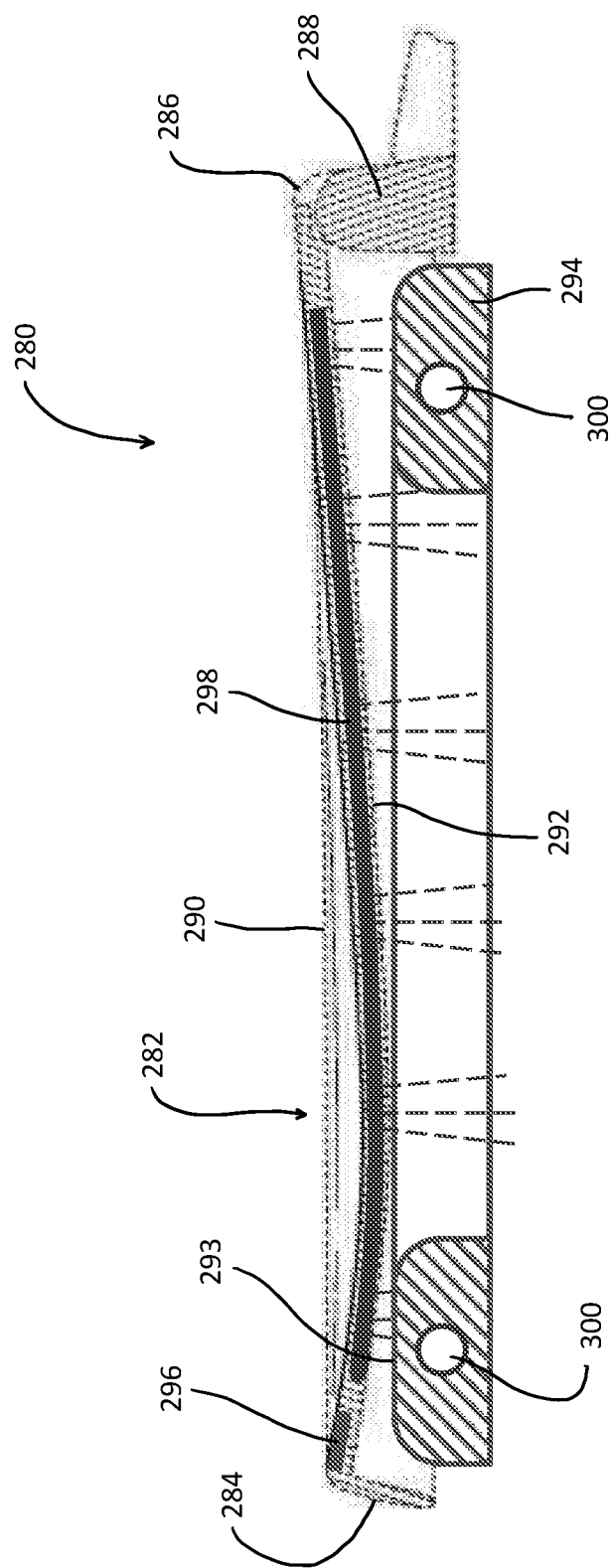
FIG. 25 is a cross-sectional view of a seat assembly according to another exemplary embodiment.

Referring now to FIG. 25, a seat assembly 280 is shown according to an exemplary embodiment. The seat assembly 280 includes a lid 282, substantially similar to the lid 246 of FIGS. 22 and 23 and defines a forward edge 284, an opposing rear edge 286, and a hinge 288 at the rear edge 286, about which the lid 282 rotates (e.g., pivots) between the raised and lowered positions. The lid 282 further defines an upper surface 290 configured to face generally upward and away from a bowl of a toilet when the lid is in the lowered position and an opposing lower surface 292 configured to face a seat 294 and the bowl when the lid 282 is in the lowered position. At least the lid 282 is formed from an epoxy or other suitable material and configured to transmit light therethrough, as described above.

A light source 298 (e.g., one or more light sources, an elongate light source, etc.) substantially similar to the light source 238 discussed above is insert-molded into the lid 282 between the upper and lower surfaces 290, 292, such that light emanates through one or both of the upper and lower surfaces 290, 292 but the light source 298 itself is not visible. For example, as shown in FIG. 25, the light emanates through the lower surface 292 onto an upper surface 293 of the seat 294 and into the bowl in order to provide a glowing aesthetic to the bowl when the light source 298 is in an "on" (e.g., illuminated) configuration. According to another exemplary embodiment, the light source 298 may be disposed proximate and configured to illuminate an outer periphery of the lid 282. The light source 298 may be configured to selectively illuminate in any way as described above. For example, the light source 298 may be coupled to a sensor 296, which indicates one or both of a position (e.g., a lowered position) of the lid 282 and/or an environmental condition (e.g., darkness). If one or more conditions are met based on an input from the sensor 296, the light source 298 turns on. While FIG. 25 shows the light source 298 and the sensor 296 installed in the lid 282, it should be understood that the light source 298 may be installed and operate in the seat 294 in substantially the same way. According to yet another exemplary embodiment, the seat 294 may include a sensor 296 or a magnet (e.g., substantially the same as the magnet 256 shown in FIGS. 22 and 23) corresponding with the sensor 296 in the lid 282 to sense the position of the lid 282. In this configuration, the light source 298 may illuminate when the lid 282 is in the "lowered" position based on determining that the sensor 296 is positioned proximate the magnet.

Referring still to FIG. 25, the seat assembly 280 is shown having insert-molded electrical components embedded in the seat 294 for integrated heating. The seat 294 includes a heating element 300 or other electric heat source embedded below the upper surface 293 of the seat 294 and fully enclosed therein. The heating element 300 is configured to be coupled to a power source (e.g., an outlet, battery, etc.) which is either embedded in the seat 294 (e.g., insert-molded) or external to the seat 294. The power source supplies electricity to the heating element 300, which then generates heat and passes the heat to various portions of the seat 294 through conduction.

According to an exemplary embodiment, the heating element 300 may be coupled to a sensor, such as the sensor 296 discussed above or another sensor disposed in the seat 294 or other portion of the toilet 210. The sensor is configured to determine whether a user is present at or near the toilet 210 or if another condition is met (e.g., an ambient temperature is below a pre-determined threshold temperature). If a user is near the toilet 210 or other required conditions are satisfied, the heating element 300 is activated and heats the seat 294. For example, the seat 294 may activate when the lid 246 is moved to the raised position. In this configuration, the heating element 300 may be electrically connected to the lid sensor 258, such that when the lid 246 is raised, the lid sensor 258 not only instructs the light sources 238 to illuminate, but also instructs the heating element 300 to activate if any other required conditions are satisfied.

Figure 26:
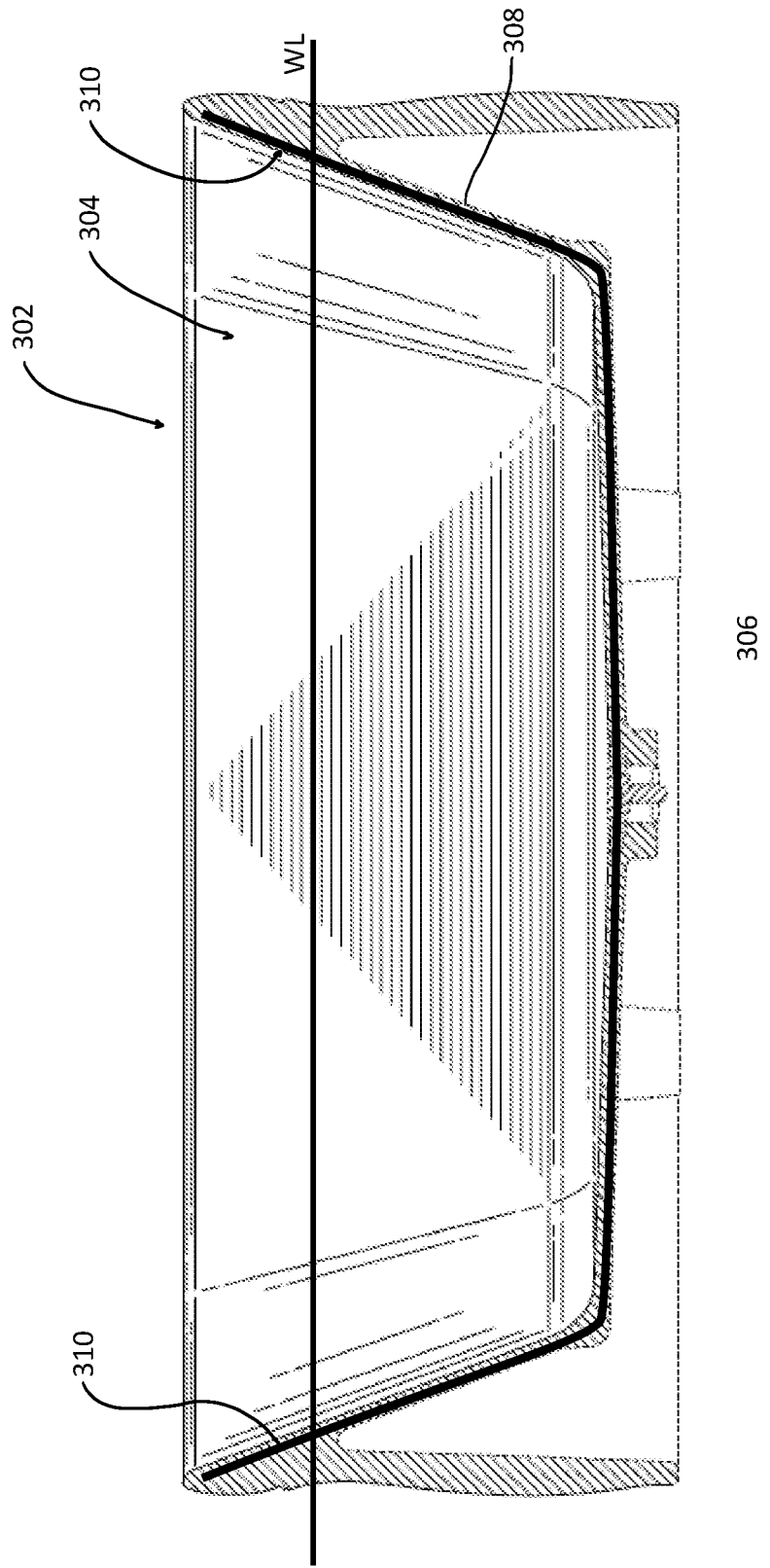
FIG. 26 is a cross-sectional view of a bathtub according to another exemplary embodiment.

While FIG. 25 shows the heating element 300 installed in the seat 294, according to other exemplary embodiments, the heating element 300 may be installed in other plumbing fixtures. Referring now to FIG. 26, the plumbing fixture is shown as a bathtub 302, according to an exemplary embodiment. The bathtub 302 includes a basin 304, formed from a base 306 and sidewalls 308 extending generally upward from the base 306. An inner surface 310 of the basin 304 is configured to contain water therein.

As shown in FIG. 26, a heating element 300 is embedded (e.g., insert-molded) in both the base 306 and the side walls 308 of the basin 304. In this configuration, the heating element 300 heats the inner surface 310 of the basin 304. The heat output from the heating element 300 transfers through one or both of the base 306 and the sidewalls 308 to the inner surface 310 and to the water contacting the inner surface 310 in order to maintain a desired temperature of the water and provide a more comfortable bathing experience for a user. Similarly, the heat may warm the inner surface 310 in order to increase the comfort for a user seated against the inner surface 310. According to another exemplary embodiment, the heating element 300 may transfer heat to a surface of the bathtub above a waterline WL, such that when a user rests his or her head against this portion of the bathtub, it is at a desirable temperature higher than an ambient temperature. While FIG. 26 shows the bathtub 302 having only one heating element 300, it should be understood that the bathtub 302 may include more than one heating elements 300, which may be electrically connected or separate and configured to operate at the same or different temperatures as each other. For example, the more than one heating elements 300 may heat different portions of the basin 304 to different temperatures. The one or more heating elements 300 may be arranged in various patterns (e.g., serpentine, zig-zag, parallel passes, etc.), such that heat is dissipated to portions or substantially all of the inner surface 310.

According to yet another exemplary embodiment, the heating element 300 may be embedded within a raised seating surface (not shown) in the bathtub 302 or a shower. For example, the heated seating surface may provide for a more comfortable experience for a user that is disabled and is required to be seated during a bathing process. The heating element 300 heats the seating surface, even when the water is not running to keep the user warm. In this configuration, a user does not get cold when the bathtub is draining.

While FIGS. 25 and 26 show a heating element 300, it should be understood that the heating element 300 may be replaced with or paired with a complementary cooling element (not shown), which is configured to transfer heat away from a user to another portion of the plumbing fixture. In this configuration, the cooling element may provide a surface that is cool to the touch, even if hot water is disposed against the surface.

One embodiment relates to a plumbing fixture formed from an epoxy and having an electrical component insert-molded into epoxy. The electrical component includes a circuit having at least one sensor configured to sense the presence of a user and at least one light source disposed proximate the at least one sensor.

Another embodiment relates to a plumbing fixture formed from an epoxy and having an electrical component insert-molded into epoxy. The electrical component includes a light source configured to transmit light to a surface of the plumbing fixture, but wherein a user cannot see the light source through the epoxy.

Another embodiment relates to a toilet seat assembly having a seat and a heat conduction device insert-molded into the seat. The heat conduction device includes a hollow conductive pipe and a heating wire disposed in the conductive pipe and configured to transfer heat to the conductive pipe. The heating wire is configured to generate heat from electricity.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

The invention claimed is:

1. A toilet assembly comprising:
   a flush engine formed from vitreous china, the flush engine comprising:
     a bowl;
     a sump at a lower portion of the bowl; and a trapway extending from the sump; and a shell configured to conceal a portion of the flush engine formed from vitreous china, the shell comprising:
  a first polymeric layer at least partially surrounding the flush engine;
  a second polymeric layer provided on the first polymeric layer; and
  a functional insert surrounded by at least the first polymeric layer and including an electrical component.

2. The toilet assembly of claim 1, wherein an inner surface of the bowl and trapway is glazed and at least one surface of the flush engine is unglazed.

3. The toilet assembly of claim 1, wherein the flush engine comprises a glazed inner surface.

4. The toilet assembly of claim 1, wherein the flush engine comprises an unglazed outer surface.

5. The toilet assembly of claim 1, further comprising:
  a rim opening formed proximate a rim of the bowl; and
  a rim supply line fluidly coupled to the rim opening and configured to supply water to the bowl;
  wherein the rim supply line is disposed in the first polymeric layer.

6. The toilet assembly of claim 5, wherein the rim supply line engages the rim opening.

7. The toilet assembly of claim 1, further comprising:
  a sump opening formed in the sump; and
  a sump supply line fluidly coupled to the sump opening and configured to supply water to the sump;
  wherein the sump supply line is disposed in the first polymeric layer.

8. The toilet assembly of claim 7, wherein the sump supply line engages the sump opening.

9. The toilet assembly of claim 7, wherein the sump supply line is formed from a flexible material in the first polymeric layer.

10. The toilet assembly of claim 7, wherein the sump supply line is formed from a hollow core in the first polymeric layer.

11. A toilet comprising:
  a toilet base structure formed from vitreous china; and
  a shell configured to conceal a portion of the base structure, the shell comprising:
    a first polymeric layer at least partially surrounding a flush engine;
    a second polymeric layer provided on the first polymeric layer; and
    a functional insert surrounded by at least the first polymeric layer and including an electrical component.

12. The toilet of claim 11, wherein the toilet base structure includes a bowl with a glazed surface, a trapway with a glazed surface, and an inlet passage with a glazed surface.

13. The toilet of claim 12, wherein other portions of the toilet base structure other than the bowl, the trapway, and the inlet passage are unglazed.

14. The toilet of claim 11, wherein the toilet base structure comprises a glazed inner surface.

15. The toilet of claim 11, wherein the toilet base structure comprises an unglazed outer surface.

16. The toilet of claim 11, further comprising:
  a rim opening; and
  a rim supply line fluidly coupled to the rim opening and configured to supply water;
  wherein the rim supply line is disposed in the first polymeric layer.

17. The toilet of claim 11, further comprising:
  a sump opening; and
  a sump supply line fluidly coupled to the sump opening and configured to supply water to the sump;
  wherein the sump supply line is disposed in the first polymeric layer.

18. The toilet of claim 11, wherein an outer surface of the first polymeric layer comprises a textured surface profile.

19. The toilet of claim 11, wherein an outer surface of the second polymeric layer comprises a smooth surface profile.

20. A toilet comprising:
  a shell configured to conceal a portion of a flush engine formed from vitreous china, wherein an inner surface of the flush engine is glazed and at least one outer surface of the flush engine in contact with the shell is unglazed, the shell comprising:
    a first polymeric layer at least partially surrounding the flush engine, the first polymeric layer comprising a foam; and
    a second polymeric layer disposed on the first polymeric layer, the second polymeric layer comprising resin;
  wherein a cavity is formed in the shell for a functional insert including an electrical component.

* * * * *